United States Patent
Liu et al.

(10) Patent No.: US 12,431,827 B2
(45) Date of Patent: Sep. 30, 2025

(54) FILTERING OF MOTOR SIGNALS FOR CHATTER DETECTION

(71) Applicant: FANUC CORPORATION, Yamanashi (JP)

(72) Inventors: Yen Po Liu, Union City, CA (US); Tetsuaki Kato, Fremont, CA (US)

(73) Assignee: FANUC CORPORATION, Yamanashi (JP)

( * ) Notice: Subject to any disclaimer, the term of this patent is extended or adjusted under 35 U.S.C. 154(b) by 161 days.

(21) Appl. No.: 18/494,239

(22) Filed: Oct. 25, 2023

(65) Prior Publication Data

US 2025/0141379 A1    May 1, 2025

(51) Int. Cl.
*H02P 21/20* (2016.01)
*H02P 21/05* (2006.01)

(52) U.S. Cl.
CPC .............. *H02P 21/20* (2016.02); *H02P 21/05* (2013.01)

(58) Field of Classification Search
CPC ................................ H02P 21/20; H02P 21/05
USPC .................................................. 318/432, 558
See application file for complete search history.

(56) References Cited

U.S. PATENT DOCUMENTS

| 8,374,717 B2 | 2/2013 | Suzuki et al. |
| 9,285,797 B2 | 3/2016 | Kondo |
| 10,496,055 B2 | 12/2019 | Matsushima et al. |
| 10,994,385 B2 * | 5/2021 | Kato .................... G05B 19/404 |

OTHER PUBLICATIONS

Aslan and Altintas, "On-Line Chatter Detection in Milling Using Drive Motor Current Commands Extracted from CNC," International Journal of Machine Tools and Manufacture, 2018,pp. 64-80, 132(February).
Okuma Corporation's 'Machining Navi' https://www.okuma.com/machining-navi.
Mazak Corporation's Smooth Ai Spindle https://english.mazak.jp/machines/technology/smooth-ai-spindle/.
Mal Inc.'s ChatterPro https://www.malinc.com/products/chatterpro/.

* cited by examiner

*Primary Examiner* — David Luo
(74) *Attorney, Agent, or Firm* — John A. Miller; Shumaker, Loop & Kendrick, LLP

(57) ABSTRACT

A sensorless method for machine tool chatter detection. A motor torque signal is analyzed in the time domain to determine whether a bit is currently cutting workpiece material. When not cutting material, an air-cut reference signal is stored for later use. When cutting material, the motor torque signal is converted to the frequency domain and filtered in a multi-step process. After removal of the air-cut reference signal via spectral subtraction, and removal of spindle harmonic components, additional filtering is performed to address aliasing and encoder error effects. The aliasing filtering removes artificial peaks in the frequency response spectrum resulting from interaction between sampling frequency and cutting frequency. The encoder error filtering removes frequency response peaks related to encoder design and interaction with motor speed. After filtering, indicator criteria are evaluated to detect chatter, and corrective action is taken when chatter is detected.

20 Claims, 11 Drawing Sheets

FILTERING OF MOTOR SIGNALS FOR CHATTER DETECTION

BACKGROUND

Field

The present disclosure relates generally to the field of chatter detection in a machine tool and, more particularly, to a method for machine tool chatter detection which requires no sensors to be added to the machine tool or its environment, where frequency-domain motor torque data is filtered in a multi-step process, including filtering out aliasing and encoder error effects, and then indicator criteria are evaluated to detect the presence of chatter.

Discussion of the Related Art

It is known in the art to use computer-controlled devices to perform machining operations, such as drilling and milling, on parts. In some applications, computer numerical controlled (CNC) machines are used which move a tool along three principle directions, with or without changes in the tool's orientation. In other applications, a multi-axis industrial robot is fitted with a machining head, and the robot can move the tool along any arbitrary spatial path while also controlling the tool orientation to any desired value.

Regardless of what type of machine tool or robot is used to perform the machining operation, the quality of the finished workpiece is always important, and conditions which may be detrimental to the workpiece quality or the longevity of the machine tool must be avoided. Chatter is a particular problem which is known to occur in some machining operations.

Chatter is a condition where unwanted vibrations of the cutting tool occur during the machining operation. For example, in a milling operation where the milling tool (bit) is cutting in a lateral direction (perpendicular to the axis of the bit), small amounts of compliance in the machine tool and the milling bit allow a vibration of the bit against the workpiece as the cutting is occurring. The vibration causes the machined surface of the workpiece to have a "scalloped" profile rather than the desired smooth profile. In addition, in some circumstances, the cutting condition can become unstable, where the scalloped profile created in one cutting pass causes subsequent passes of the bit to cut rapidly-changing and uneven thicknesses of material. The uneven cut thickness then increases the amplitude of the chatter vibration.

When unstable chatter is experienced, the workpiece is often ruined, and damage to the milling bit or even the machine tool itself may occur. It is therefore desirable to detect chatter as soon as it happens, and take steps to eliminate it.

Techniques are known in the art for machine tool chatter detection. Many existing systems require the addition of vibration sensors or microphones to the machine tool environment, and to integrate the associated data acquisition and analysis system into the machine tool controller. Other techniques for chatter detection require measurement of the machine tool system's structural dynamics to identify natural frequencies of vibration, and use this information to predict machining stability. Still other chatter detection techniques use an artificial intelligence approach, where a machine learning system uses data from multiple sensors to learn to identify both stable and unstable cutting conditions.

The existing chatter detection techniques described above all suffer from one or more drawbacks, including the need for sensors and data acquisition equipment to be added to the machine tool system, the need for a structural dynamic model of the machine tool system to be used for prediction of problematic conditions, and the computationally-intensive and data-intensive nature of the analysis. In addition, most existing chatter detection techniques can only detect severe chatter exceeding a certain amplitude, and may therefore miss light chatter conditions.

In view of the circumstances described above, there is a need for an improved machine tool chatter detection method which does not require external sensors or integration of data acquisition equipment, and which can detect chatter at any frequency even at low amplitude.

SUMMARY

The present disclosure describes a method for machine tool chatter detection which requires no sensors to be added to the machine tool or its environment. When the machine tool spindle is running, a motor torque signal is analyzed in the time domain to determine whether a bit is currently cutting material from a workpiece. When not cutting material, an air-cut reference signal is stored for use in a later step. When cutting material, the motor torque signal is converted to the frequency domain and filtered in a multi-step process. After removal of the air-cut reference signal via spectral subtraction, and removal of spindle harmonic components at known frequencies, additional filtering is performed to address aliasing and encoder error effects. The aliasing filtering removes artificial peaks in the frequency response spectrum resulting from the interaction between sampling frequency and cutting frequency. The encoder error filtering removes frequency response peaks related to encoder design and its interaction with motor speed. After filtering, various indicator criteria are evaluated to detect the presence of chatter, including a magnitude of the filtered torque signal and a magnitude ratio of the filtered torque signal to the air-cut reference signal. Corrective action is taken in the form of discrete spindle speed variation when chatter is detected.

Additional features of the presently disclosed systems and methods will become apparent from the following description and appended claims, taken in conjunction with the accompanying drawings.

DETAILED DESCRIPTION OF THE EMBODIMENTS

The following discussion of the embodiments of the disclosure directed to sensorless machine tool chatter detection is merely exemplary in nature, and is in no way intended to limit the disclosed devices and techniques or their applications or uses.

Chatter is a phenomenon which sometimes occurs during machining operations by machine tools. A typical example is in a milling operation, where the tip of an end mill vibrates laterally as it cuts material from a workpiece. Because chatter can cause substandard workpiece quality, and even damage to the workpiece and/or the machine tool, it is desirable to avoid chatter as much as possible in machining operations.

Figure 1:
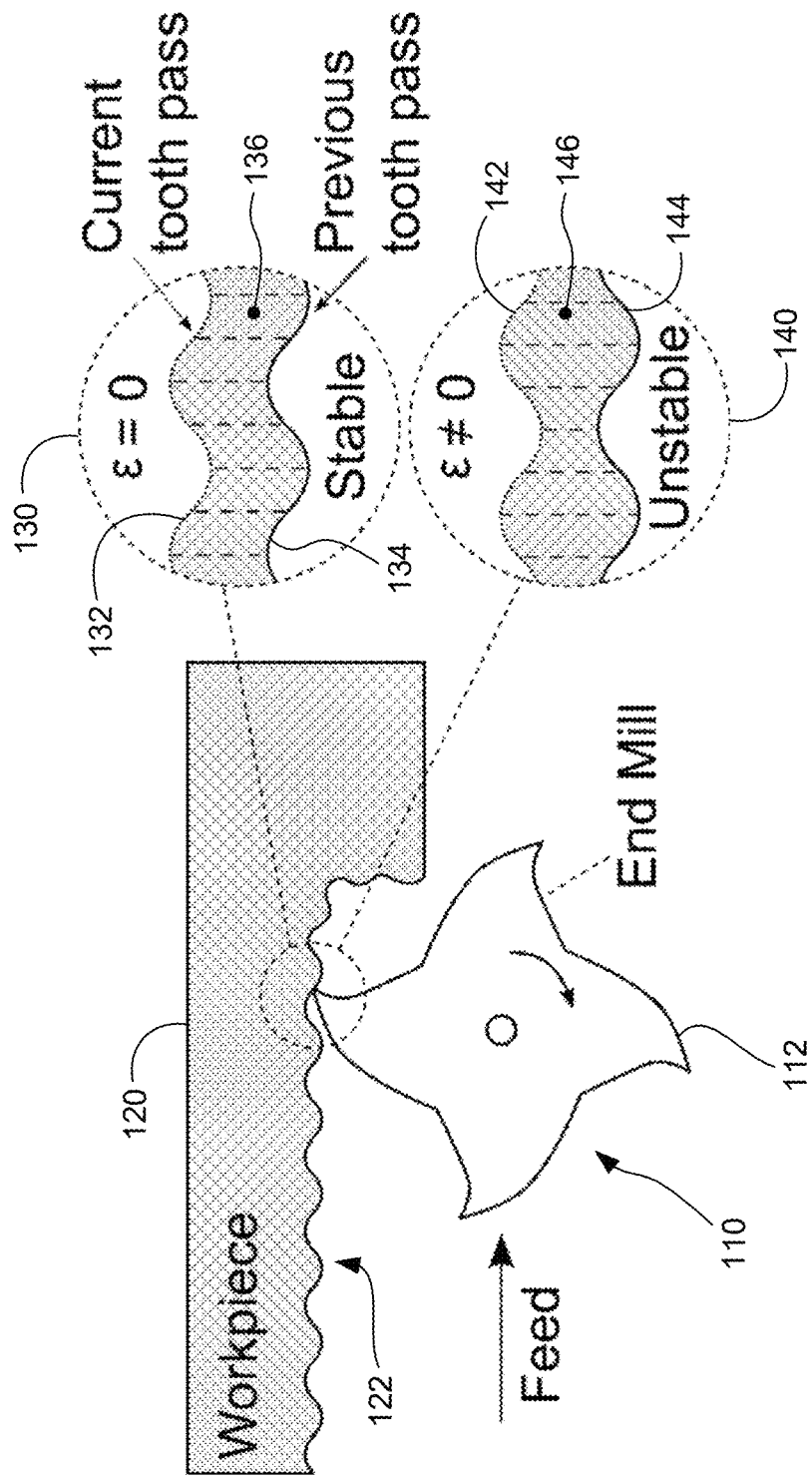
FIG. 1 is an illustration of a workpiece machining operation and the basic concepts involved in unstable machine tool chatter.

FIG. 1 is an illustration of a workpiece machining operation and the basic concepts involved in machine tool chatter. An end mill 110 is fitted in a spindle of a machine tool (not shown). The end mill 110 is rotated at a high speed about its central axis by the spindle. The machine tool moves the end mill 110 according to a computer programmed tool path to perform the machining operation on a workpiece 120. Depending on the type of machine tool or robot in which it is fitted, the end mill 110 may be moved in translation only (in three dimensions), or the end mill 110 may be rotated to different orientations in addition to the translational motion. In the example depicted in FIG. 1, the end mill 110 moves in a feed direction as indicated by the annotated arrow, and cuts material from the workpiece 120 as shown. The end mill 110 has four cutting "teeth" or flutes 112. The end mill 110 is merely exemplary, and it is to be understood that the chatter concepts discussed here apply to cutting tools generally, and the chatter detection techniques of the present disclosure are applicable to other milling tools and other types of cutting devices where the chatter phenomenon may be encountered.

FIG. 1 depicts a chatter condition, where the end mill 110 vibrates in a lateral direction toward and away from the workpiece 120. The vibration is made possible by small amounts of compliance and/or looseness in the machine tool—including flexibility of the end mill 110 itself, in the mounting bearings of the spindle, in the overall machine tool mounting and positioning structures, and so forth.

During machining, the machined surface of the workpiece 120 does not have a perfectly smooth profile as desired, but rather has a wavy or scalloped shape characterized by vibration marks as indicated at 122. All of the surface waviness illustrated in FIG. 1 is exaggerated for visual effect, but the vibration marks on the workpiece surface can in fact be significant enough to negatively impact workpiece quality. Cutting conditions may be stable or unstable (i.e., chatter), as discussed further below.

In a stable cutting condition as illustrated in inset 130, the vibration marks left by a current tooth pass 132 are in phase with the vibration marks left by a previous tooth pass 134. That is, the vibration marks have a phase angle of zero ($\varepsilon=0$). When the vibration marks from one pass to the next are in phase, the amount of material being cut by the end mill 110 is essentially constant in thickness. In other words, a "chip thickness" 136 is essentially constant, as it would be in an ideal non-chattering condition.

In an unstable chatter condition as illustrated in inset 140, the vibration marks left by a current tooth pass 142 are out of phase with the vibration marks left by a previous tooth pass 144. That is, the vibration marks have a non-zero phase angle ($\varepsilon \neq 0$). In the example shown in the inset 140, the vibration marks from the current tooth pass 142 are about 180 degrees out of phase with the vibration marks left by the previous tooth pass 144. When the vibration marks from one pass to the next are out of phase, the amount of material being cut by the end mill 110 varies in thickness. In other words, a chip thickness 146 is not constant. The variations in the chip thickness 146 cause corresponding variations in the motor torque and speed, which can create an unstable condition where the magnitude of the vibrations increases. Unstable chatter can lead to workpiece damage and even damage to the machine tool or the end mill 110.

Figure 2:
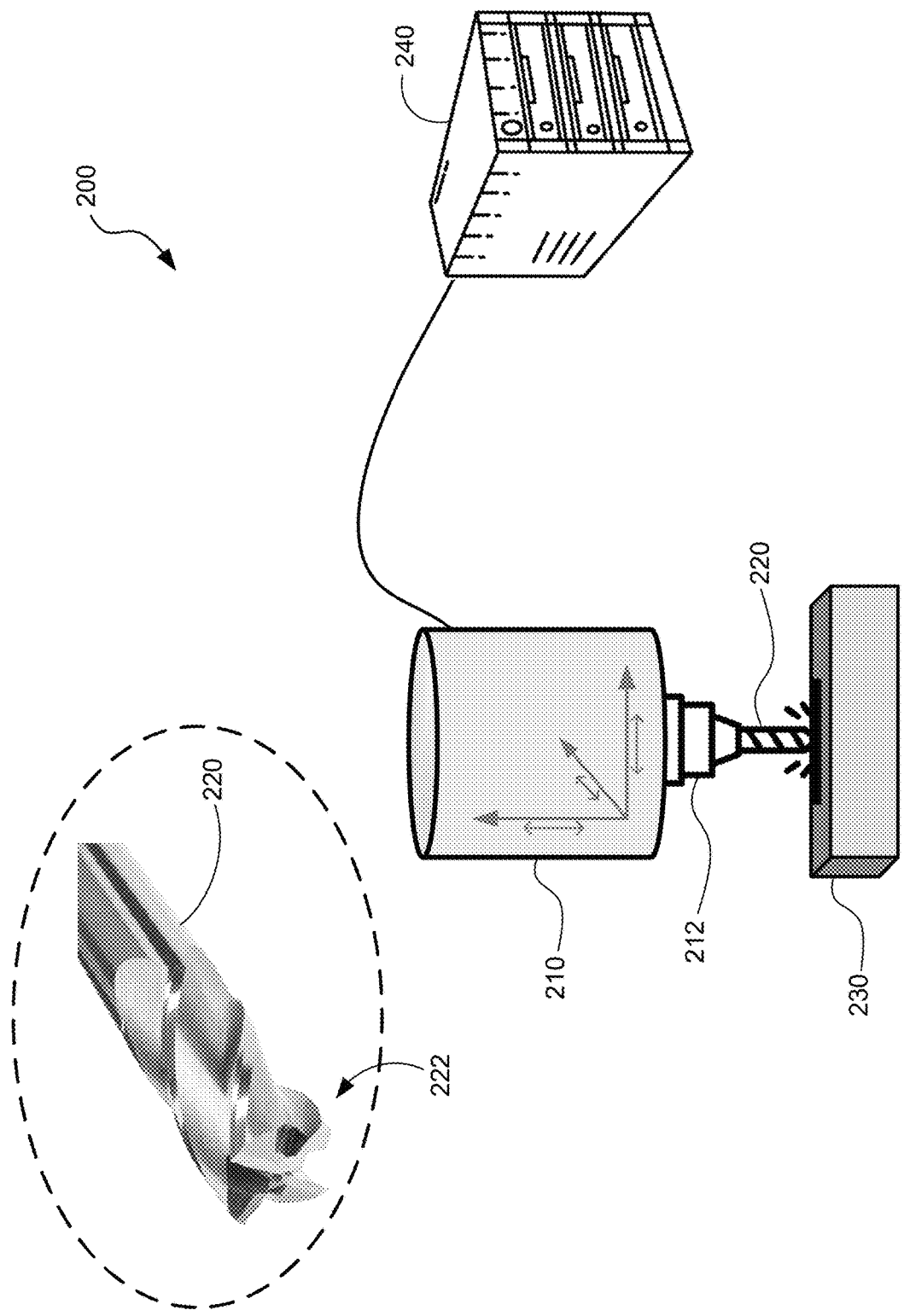
FIG. 2 is a schematic illustration of a system including a computer-controlled machine tool performing a machining operation on a workpiece, of a type applicable to the techniques of the present disclosure.

FIG. 2 is a schematic illustration of a system 200 including a computer-controlled machine tool performing a machining operation on a workpiece, of a type applicable to the techniques of the present disclosure. A machine tool 210 rotates a spindle 212 in which is secured a cutting bit, in this case an end mill 220. The machine tool 210 causes the end mill 220 to perform a machining operation on a workpiece 230. The machine tool 210 is in communication with a controller 240, which is a computing device that provides motion commands and spindle motor speed commands to the machine tool 210. In a typical example, the machine tool 210 would move the rotating end mill 220 from a start point along a path which causes material to be cut from the workpiece 230, disengage the end mill 220 from the workpiece 230 and move the end mill 220 back to a location near the start point, and then make another pass which cuts more material from the workpiece 230.

The end mill 220 is shown in more detail in the inset, where the teeth or flutes are visible at a tip 222. Again in this example, the end mill 220 includes four teeth or flutes. The number of flutes is significant in relation to chatter conditions, as the cutting teeth engaging the workpiece during mill rotation leave successive vibration marks.

As will be discussed in detail below, the techniques of the present disclosure are applicable to the system 200. Specifically, the presently disclosed chatter detection method may be programmed in the controller 240 using data that is readily available in the existing controller architecture. No sensors, microphones or other data acquisition devices are needed for data collection, and no integration of separate data acquisition or sensor sub-systems with the controller 240 is required.

The elements of FIG. 2 are depicted in rather simple fashion, where the machine tool 210 is movable in three principle axes of motion—including "vertically" (parallel to the axis of the end mill 220) and in two "horizontal" directions (orthogonal to the axis of the end mill 220). It is to be understood that the chatter detection method of the present disclosure is applicable to any type of machine tool where chatter may be encountered—including multi-axis machines with tool positioning and orientation capability, and robotically-controlled mills and drills with an articulated robot arm providing complete tool positioning and orientation flexibility.

Figure 3:
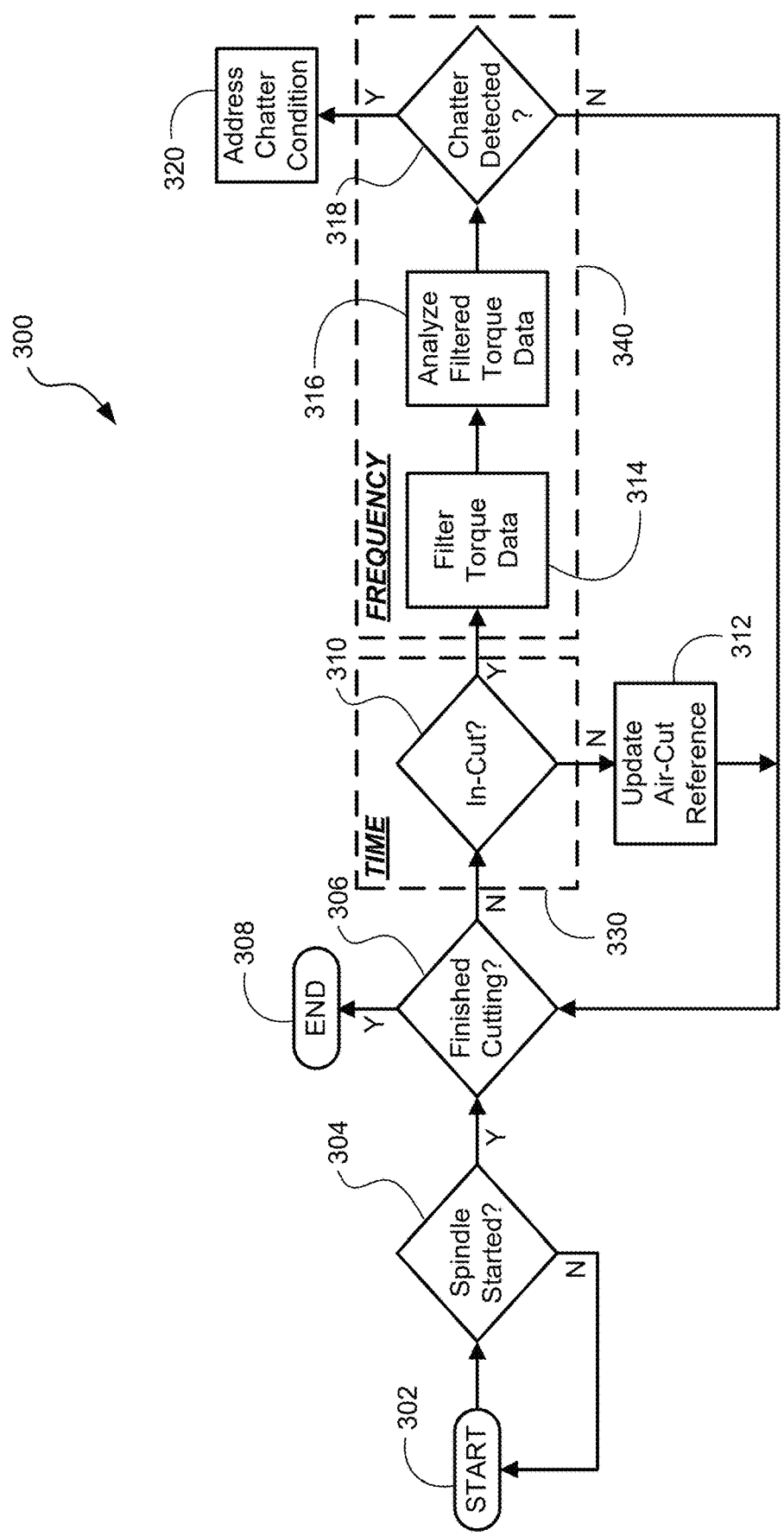
FIG. 3 is a flowchart diagram of a method for sensorless chatter detection in a machine tool, using a two-step filtering process in the frequency domain and evaluation of two indicator criteria, according to an embodiment of the present disclosure.

FIG. 3 is a flowchart diagram 300 of a method for sensorless chatter detection in a machine tool, using a two-step filtering process in the frequency domain and evaluation of two indicator criteria, according to an embodiment of the present disclosure. The method of FIG. 3 can be programmed to run in the machine tool controller 240, and uses input data which is readily available in any controller architecture. The disclosed method includes filtering and analysis steps which enable chatter detection without the complications and limitations of previously existing methods.

Beginning at a start block 302, the process moves to decision diamond 304 where it is determined whether the spindle of the machine tool is turning (i.e., running, or started). If the spindle is not turning, then there is no need for chatter analysis and the process waits until the spindle is started. When the spindle is turning, the process moves to decision diamond 306 where it is determined if the cutting operation has been finished. Information about whether the spindle is turning (at the decision diamond 304) and whether the cutting operation has finished (at the decision diamond 306) is available in the controller from the machine control program which is running (i.e., the "numerical control" program which defines the sequence of cutting paths/operations to be performed on the workpiece). If the cutting operation has been finished, then the process ends at terminus 308. If the cutting operation has not been finished, the process moves to decision diamond 310.

The remaining steps in the flowchart diagram 300 are all based on analysis of motor torque data. The basic premise is that chatter, if it is occurring, will be manifested in motor torque data, as the vibrations experienced at the cutter-workpiece interface will cause corresponding oscillation of the cutter rotational speed and hence the commanded motor torque. The commanded motor torque is readily available in the software running on the machine controller, where the torque command is either directly available as a machine state, or is determinable from motor current data which is available. Throughout the remainder of the discussion, most of the analysis is based on spindle torque command data (designated as $T_{cmd}$). A step which is performed in the time domain is contained in a dashed box 330, and steps which are performed in the frequency domain are contained in a dashed box 340.

At the decision diamond 310, it is determined whether the cutting bit (e.g., the end mill) is in the process of cutting material from the workpiece. This determination is made by comparing the present torque command signal to a torque command signal for a known air-cut condition which is stored as a reference. Specifically, the determination is made by evaluating time-domain signals and comparing the maximum value of the present torque command to the maximum value of the air-cut torque command. The following inequality is evaluated:

$$\max T_{cmd}(t) \geq \alpha_{air} \cdot \max T_{cmd}^{air}(t) \qquad (1)$$

where $T_{cmd}(t)$ is the present torque command signal in the time domain, $T_{cmd}^{air}(t)$ is a reference air-cut torque command signal in the time domain, and $\alpha_{air}$ is a predefined constant. If $\alpha_{air}$ is defined to have a value of 1.2, for example, then when the inequality is true, the present motor torque command is at least 20% greater than the air-cut motor torque command, and it is therefore known that the cutting bit (e.g., the end mill) is in the process of cutting material from the workpiece. While Inequality (1) references the maximum value of the torque command signal, its average value may be adopted as an alternative formulation. The Inequality (1) is evaluated in the decision diamond 310.

If the cutting bit is not presently cutting workpiece material, then at block 312 the air-cut reference torque signal is updated (such as by averaging the currently-collected air-cut torque data with previously-collected data) and the process returns to the decision diamond 306. Updating the air-cut reference torque signal is done periodically to ensure that current data is stored, as the air-cut torque signal can change over time as conditions in the machine tool change (e.g., bearing wear, lubrication condition changes, etc.). It is important to have current and accurate air-cut reference data available, because the air-cut torque data contains characteristic features of the machine which are significant in later filtering and analysis steps.

From the decision diamond 310, if the machine tool is presently cutting workpiece material, then at block 314 the time-domain motor torque signal is converted to the frequency domain and a two-step filtering process is performed. A Fast Fourier Transform (FFT) is a technique which may be performed in a known manner on the time-domain motor torque command signal ($T_{cmd}(t)$) to produce frequency-domain torque command data ($T_{cmd}(\omega)$). Other techniques for converting the time-domain motor torque signal to the frequency domain, as known in the art. The frequency-domain motor torque command data ($T_{cmd}(\omega)$) at any moment in time (for example, at a time of 3.5 seconds into a cutting operation) may be visualized as a frequency response graph, as shown in later figures and discussed below.

Two filtering steps are then performed on the frequency-domain torque command data. The first filtering step is to remove the air-cut torque data via spectral subtraction, and is computed as follows:

$$|T_{cmd}^{filt}(\omega)| = |T_{cmd}(\omega)| - \alpha_{sp} \cdot |T_{cmd}^{air}(\omega)| \qquad (2)$$

where $T_{cmd}^{filt}(\omega)$ is the filtered frequency-domain motor torque command data, $T_{cmd}(\omega)$ is the original (unfiltered) frequency-domain motor torque command data from the FFT, $T_{cmd}^{air}(\omega)$ is the frequency-domain reference air-cut torque command data (also from an FFT), and $\alpha_{sp}$ is a predefined constant which controls the amount of the air-cut torque data to remove. Equation (2) is applied across the frequency spectrum (from 100 Hz to 2000 Hz, for example)

to produce the filtered motor torque command data with air-cut torque data removed. As will be shown in later figures and discussed below, removal of the air-cut torque data effectively eliminates many frequency response "spikes" or "hot spots" in the resulting data which clearly have nothing to do with chatter, because chatter cannot be present in air-cut conditions.

Depending on the value of asp and the nature of the motor torque and air-cut torque command data, it is possible for Equation (2) to result in small negative values at some frequencies. A mapping function M(•) is therefore applied to the filtered motor torque command data before proceeding further in the chatter detection method. The mapping function is defined as follows;

$$M(|T_{cmd}^{filt}(\omega)|) = \begin{cases} |T_{cmd}^{filt}(\omega)| & \text{if } |T_{cmd}(\omega)| - \alpha_{sp} \cdot |T_{cmd}^{air}(\omega)| > 0 \\ 0.01 \cdot |T_{cmd}(\omega)| & \text{otherwise} \end{cases} \quad (3)$$

where all of the variables appearing in Equation (3) have been defined above. The mapping function of Equation (3) dictates that, for each frequency across the frequency spectrum, if the right side of the equal sign in Equation (2) yields a positive value, then that value is used for the filtered torque command. On the other hand, if the right side of the equal sign in Equation (2) yields a negative value or zero, then the filtered torque command is computed as a small multiplier times the unfiltered torque command, in absolute value. The mapping function of Equation (3) eliminates negative values from the frequency response spectrum of the filtered motor torque data while ensuring that any significant spikes in the frequency response spectrum of the air-cut data are removed from the filtered motor torque data.

The second filtering step is to remove spindle harmonic components at specific frequencies in the frequency response spectrum of the filtered motor torque data, and is computed using the following calculation:

$$|T_{cmd}^{filt}(\omega)| = 0.01 \cdot |T_{cmd}^{filt}(\omega)| \quad (4)$$

$$\{\omega = k \cdot \omega_{spindle}\}$$

$$\{k = 1, 2, \dots\}$$

The filtering step defined in Equation (4) dictates that for each frequency ω which is an integer multiple k of the spindle rotation speed $\omega_{spindle}$ (in revolutions per second), the filtered torque command is multiplied by a small value (e.g., 0.01) in order to dramatically reduce its magnitude. The purpose of the second filtering step is to remove spindle harmonic components which may persist and appear misleadingly significant in frequency response graphs in light chatter cases. This second filtering step has an effect similar to a comb filter, dampening out frequency response data at specific frequencies, but without the undesirable comb filtering effect of distorting nearby contents in the frequency response spectrum.

After the second filtering step described above and in Equation (4), the filtering of the frequency-domain motor torque data at the block 314 of FIG. 3 is complete. The resultant filtered torque command data ($T_{cmd}^{filt}(\omega)$) produced by Equations (2)-(4) is then used for chatter analysis and detection.

Figure 4:
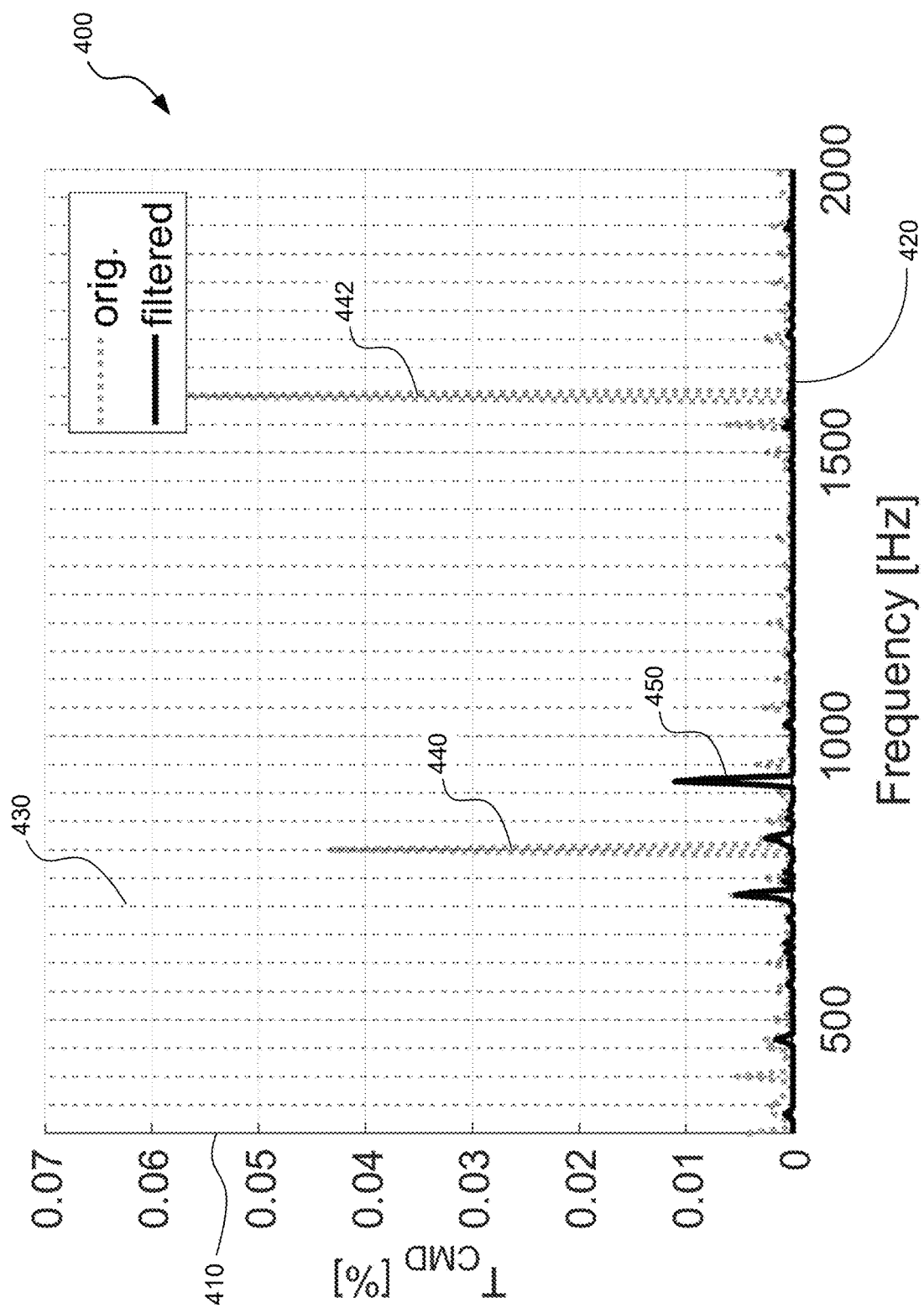
FIG. 4 is a frequency response graph of motor torque command data both before and after filtering using the method of FIG. 3, according to an embodiment of the present disclosure.

FIG. 4 is a frequency response graph 400 of motor torque command data both before and after filtering using the method of the block 314 of FIG. 3, according to an embodiment of the present disclosure. The graph 400 plots a spindle torque command (as a percentage of a maximum value) on a vertical axis 410 against frequency on a horizontal axis 420. Vertical dashed lines 430 coincide with spindle harmonic frequencies.

The graph 400 includes plots for both original (unfiltered) torque data and filtered torque data, as indicated by the legend. The original, unfiltered torque data includes large spikes in the response, such as those indicated at 440 and 442. The response spikes 440 and 442 could be signal noise or from a natural frequency characteristic of the machine tool, and possibly exacerbated by the machine tool natural frequency corresponding with a spindle harmonic frequency. The spikes 440/442 and others could easily be mistaken for chatter in an analysis of the original, unfiltered torque data.

The filtered torque data includes some smaller spikes in the frequency response, such as the one indicated at 450. A detailed analysis of the actual machine performance, during the experiment which produced this data, reveals that the spike 450 corresponds with actual chatter at 920 Hz. Two observations about this are noteworthy. First, by using the filtering techniques described above with respect to the block 314 of FIG. 3, the frequency response content related to actual chatter becomes obvious and easy to detect. Second, in the original (unfiltered) data, the chatter at 920 Hz is not apparent, particularly in comparison to the large spikes 440 and 442 ("false positives") which do not correspond with actual chatter of the mill against the workpiece.

Returning to the flowchart diagram 300 of FIG. 3—after the filtering steps of the block 314, producing data as illustrated in FIG. 4 and discussed above, at block 316 the resultant filtered torque command data $T_{cmd}^{filt}(\omega)$) is analyzed for indications of chatter. In the presently disclosed method, two different chatter indicators are evaluated at the block 316. The data being evaluated is in the frequency domain, as explained earlier.

The first chatter indicator parameter is the magnitude of the filtered spindle torque command data ($T_{cmd}^{filt}(\omega)$), discussed above and produced using Equations (2)-(4). In one embodiment, the criteria for evaluation of the filtered torque command data is as follows; at each frequency in the frequency response spectrum, if the magnitude of the filtered torque command is much greater than the magnitude of the air-cut torque command ($T_{cmd}^{air}(\omega)$) at the same frequency, then chatter is occurring at that frequency. Conversely, if the magnitude of the filtered torque command is less than or equal to the magnitude of the air-cut torque command at the same frequency, then chatter is not occurring at that frequency. That is:

$$|T_{cmd}^{filt}(\omega)| \gg |T_{cmd}^{air}(\omega)| \text{ if chatter} \quad (5)$$

$$|T_{cmd}^{filt}(\omega)| \leq |T_{cmd}^{air}(\omega)| \text{ otherwise} \quad (6)$$

It will be recalled that the air-cut torque command data has already been subtracted from the spindle torque command data in the filtered data, in the spectral subtraction of Equation (2). Thus, the filtered torque command data would be expected to be less than or equal to the air-cut torque data across the frequency spectrum except for any frequencies at which chatter is occurring. The spike 450 of FIG. 4 is an example which meets the criteria of Inequality (5) and is readily detectable as a chatter condition.

The second chatter indicator parameter is the magnitude ratio of the filtered spindle torque command data ($T_{cmd}^{filt}(\omega)$) to the air-cut torque command data ($T_{cmd}^{air}(\omega)$). In one embodiment, the criteria for evaluation of the ratio is as follows; at each frequency in the frequency response spectrum, if the magnitude of the ratio is much greater than zero, then chatter is occurring at that frequency. Conversely, if the magnitude ratio is approximately equal to zero, then chatter is not occurring at that frequency. That is:

$$\frac{|T_{cmd}^{filt}(\omega)|}{|T_{cmd}^{air}(\omega)|} \gg 0 \text{ if chatter} \quad (7)$$

$$\frac{|T_{cmd}^{filt}(\omega)|}{|T_{cmd}^{air}(\omega)|} \approx 0 \text{ otherwise} \quad (8)$$

The second chatter indicator also addresses distortion from spindle dynamics. It is known that the torque command at the spindle varies from the torque at the tool tip, and that the variance (known as distortion) changes with frequency (spindle speed). However, the second chatter indicator defined above alleviates this distortion because it is a ratio, and the distortion in the numerator cancels with that of the denominator.

The meaning of "much greater than" in the Inequalities (5) and (7) may be defined in a manner found to be suitable for a particular application—such as "ten times greater", or "fifty times greater", etc. Preferably, the computed values of the chatter indicators are checked against pre-defined thresholds for chatter detection, where the thresholds (one for each of the chatter indicators) are defined based on experience from known chatter and non-chatter operational data. A statistical analysis such as Z-score (median and deviation analysis) may also be used to determine if particular features in the frequency response data, for both of the indicator parameters, are outliers indicative of chatter.

When either the first or second chatter indicator (or both) indicates that chatter is occurring, a chatter frequency $\omega_{chatter}$ is identified as the particular frequency at which the Inequality (5) and/or (7) is true. When chatter is detected and the chatter frequency is identified, the two chatter indicators may be further evaluated at sideband frequencies (higher or lower than the chatter frequency by multiples of the spindle speed) for confirmative indications of chatter. This is discussed further below.

At decision diamond 318, it is determined if chatter is detected in either of the indicators from the block 316 described above. If so, then at block 320 the machine controller takes steps to address and eliminate the chatter condition. A primary technique used to eliminate chatter is to change the spindle speed, thereby moving away from the condition (i.e., a resonance or dynamic response which creates the phase shift depicted in FIG. 1) which is causing the chatter. One technique for identifying spindle speeds having the potential to eliminate chatter uses the following calculation:

$$\Omega_{spindle} = \frac{60 \cdot \omega_{chatter}}{2 \cdot N_{flutes} k \pi} \quad (9)$$

$$\{k = 1, 2, \ldots\}$$

Where $\Omega_{spindle}$ is the calculated new spindle speed in RPM, $\omega_{chatter}$ is the identified chatter frequency, and $N_{flutes}$ is the number of flutes or cutting edges on the mill. A value of the integer multiplier k can be selected to provide a spindle speed which is considered suitable for the machining operation—such as a new spindle speed which is within a certain percentage of the old spindle speed.

At the decision diamond 318, if chatter is not detected in the analysis of the indicators at the block 316, then the process loops back to the decision diamond 306 where, if the operation is not completed, the chatter detection methodology is repeated. This repetition of the chatter detection continues until the cutting operation is concluded.

Figure 5A:
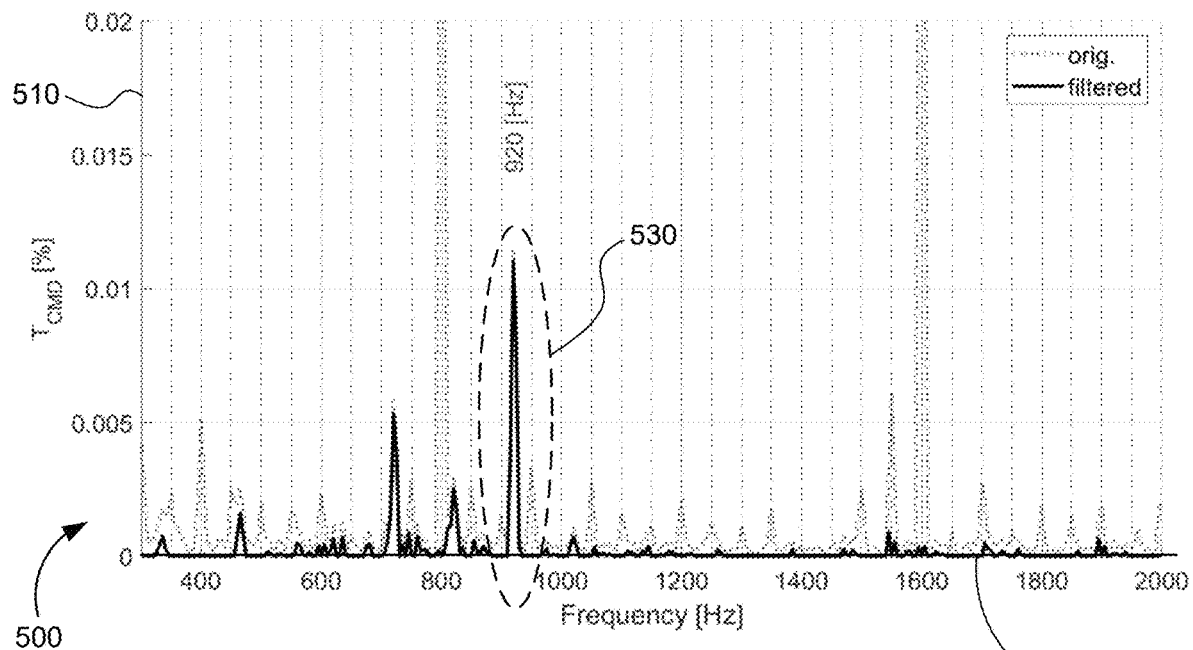
FIGS. 5A and 5B are frequency response graphs of motor torque command data in a chatter condition and a non-chatter condition, respectively, illustrating the effects of the filtering steps and the resultant chatter indicator analysis of FIG. 3, according to embodiments of the present disclosure.
Figure 5B:
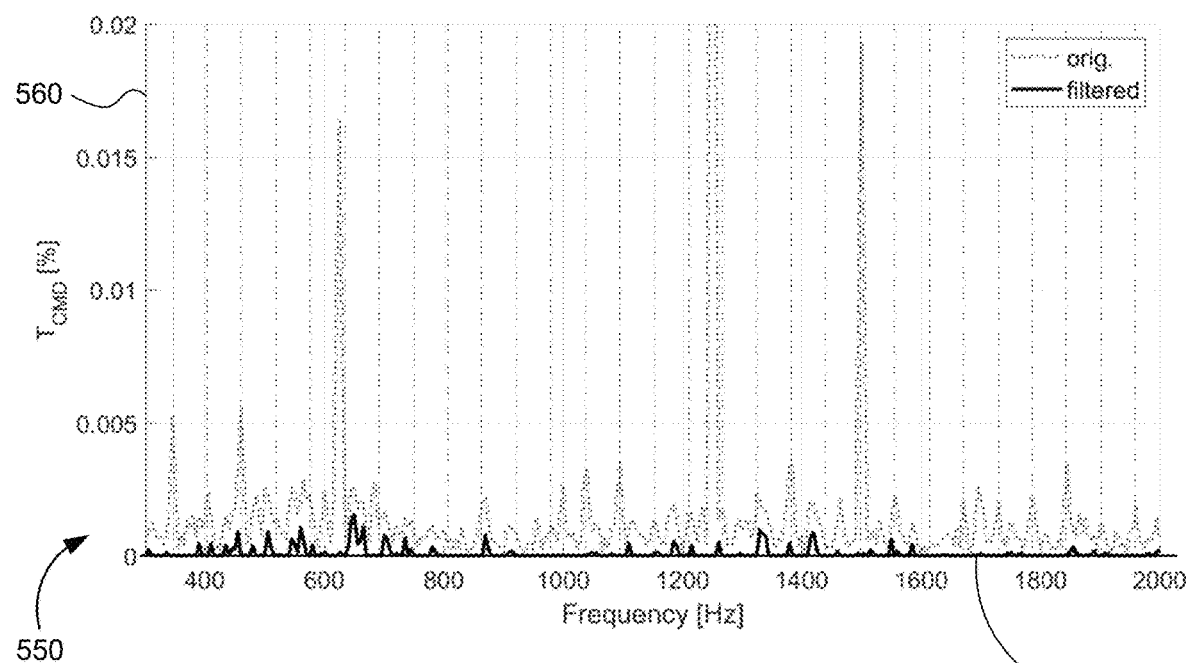

FIGS. 5A and 5B are frequency response graphs of a motor torque command in a chatter condition and a non-chatter condition, respectively, illustrating the effects of the filtering steps and the resultant chatter indicator analysis of FIG. 3, according to embodiments of the present disclosure. The filtered motor torque (a.k.a., spindle torque) command ($T_{cmd}^{filt}(\omega)$) is the first chatter indicator parameter discussed above.

FIG. 5A is a graph 500 which plots the motor/spindle torque command (as a percentage of a maximum value) on a vertical axis 510 against frequency on a horizontal axis 520. Again, the vertical dashed lines coincide with spindle harmonic frequencies. The graph 500 includes plots for both original (unfiltered) torque data and filtered torque data, as indicated by the legend. The filtered torque data (produced as discussed above using Equations (2)-(4)) includes a large feature (spike) in the response data, indicated in ellipse 530. Based on the magnitude of this spike relative to the air-cut torque data, the spike in the ellipse 530 is easily identified as chatter. The chatter frequency $\omega_{chatter}$ is identified as 920 Hz. Two smaller spikes, also present in the filtered torque data (to the left of the ellipse 530), may be indicative of chatter occurring at frequencies which are offset from the chatter frequency by multiples of the spindle speed. That is, minor chatter sideband frequencies may occur at $\omega=\omega_{chatter}\pm k \cdot \omega_{spindle}$, where $k=1, 2, \ldots$ and $\omega_{spindle}$ is the spindle speed in revolutions per second.

The data depicted in FIG. 5A was collected from an experimental milling operation where chatter at 920 Hz was independently verified. Conversely, FIG. 5B depicts frequency response data for a similar experimental milling operation where independent monitoring detected no chatter. FIG. 5B is a graph 550 which plots the spindle torque command (as a percentage of a maximum value) on a vertical axis 560 against frequency on a horizontal axis 570. The graph 550 again includes plots for both original (unfiltered) torque data and filtered torque data, as indicated by the legend. It can be seen that there are no significant spikes in the filtered torque response data, which agrees with the independent monitoring and analysis which was performed during the experiment. Again, the torque data filtered according to the techniques of the present disclosure make it readily apparent that no chatter is occurring in the graph 550 of FIG. 5B.

In both the graph 500 (FIG. 5A) and the graph 550 (FIG. 5B), the original, unfiltered torque data includes large spikes in the response, similar to those discussed earlier with respect to FIG. 4. Many spikes in the response—both small and large—correspond with spindle harmonic frequencies, while other spikes correspond with other machine dynamic response characteristics. The spikes in the original, unfiltered torque data are virtually all eliminated in the filtered torque data, allowing easy identification of the true chatter condition observed in FIG. 5A.

Figure 6A:
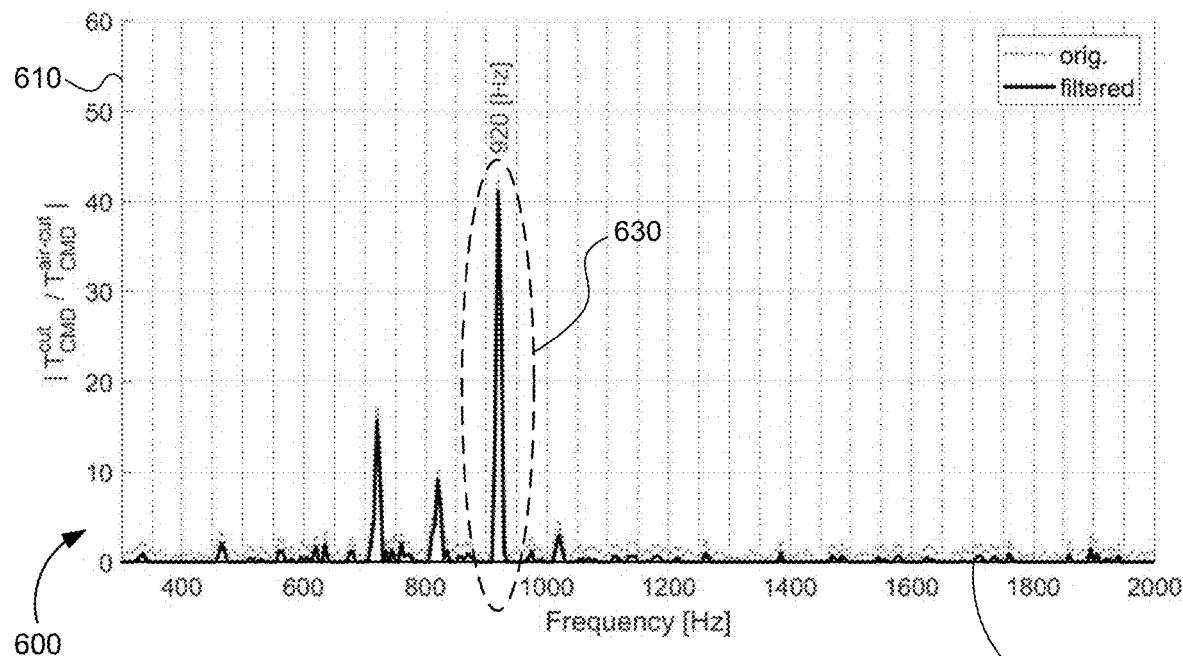
FIGS. 6A and 6B are frequency response graphs of motor torque ratio (cutting over air-cut) in a chatter condition and a non-chatter condition, respectively, illustrating the effects of the filtering steps and the resultant chatter indicator analysis of FIG. 3, according to embodiments of the present disclosure.
Figure 6B:
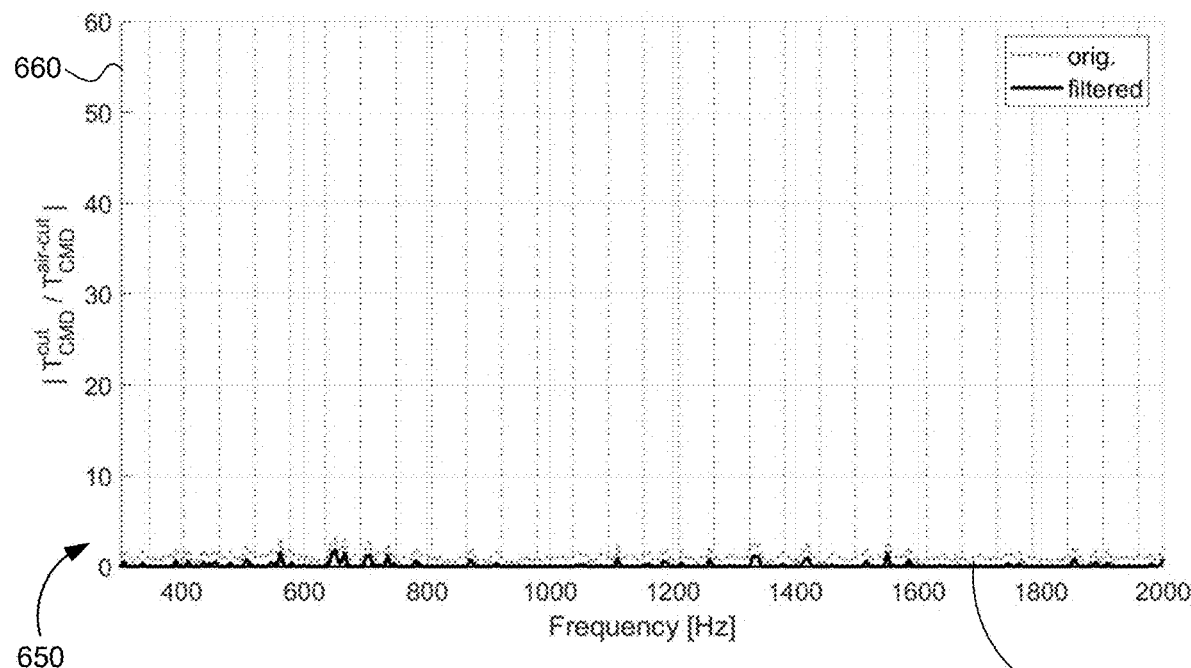

FIGS. 6A and 6B are frequency response graphs of a motor torque ratio (cutting over air-cut) in a chatter condition and a non-chatter condition, respectively, illustrating the effects of the filtering steps and the resultant chatter indicator analysis of FIG. 3, according to embodiments of the present disclosure. The motor torque ratio ($T_{cmd}^{filt}(\omega)/T_{cmd}^{air}(\omega)$) is the second chatter indicator parameter discussed above.

FIG. 6A is a graph 600 which plots the motor torque ratio (cutting over air-cut) on a vertical axis 610 against frequency on a horizontal axis 620. Again, the vertical dashed lines coincide with spindle harmonic frequencies. The graph 600 includes plots for both original (unfiltered) torque data and filtered torque data, as per the previously discussed graphs. The ratio using filtered torque data includes a large feature (spike) in the response data, indicated in ellipse 630. Based on the magnitude of this spike (much greater than zero), the spike in the ellipse 630 is easily identified as chatter. The chatter frequency $\omega_{chatter}$ is identified as 920 Hz, which corresponds to the chatter frequency identified in FIG. 5A using data from the same experiment. Smaller spikes, also present in the filtered torque ratio data, may indicate chatter occurring at frequencies offset from the chatter frequency by multiples of the spindle speed.

The data depicted in FIG. 6A was collected from the experimental milling operation where chatter at 920 Hz was independently verified. Conversely, FIG. 6B depicts frequency response data for a similar experimental milling operation where independent monitoring detected no chatter. FIG. 6B is a graph 650 which plots the spindle torque ratio (cutting over air-cut) on a vertical axis 660 against frequency on a horizontal axis 670. The graph 650 again includes plots for both original (unfiltered) torque data and filtered torque data, as indicated by the legend. It can be seen that there are no significant spikes in the torque ratio data, which agrees with the independent monitoring and analysis which was performed during the experiment. Again, the torque ratio indicator according to the techniques of the present disclosure make it readily apparent that no chatter is occurring in the graph 650 of FIG. 6B.

The results depicted in FIGS. 5 and 6 have been validated in experiments using external sensors including accelerometers and audio recording equipment. In the experimental operating conditions reflected in FIGS. 5A and 6A, the external sensors confirmed the presence of chatter at the frequency of 920 Hz identified by analysis of the chatter indicator parameters discussed above. In the experimental operating conditions reflected in FIGS. 5B and 6B, the external sensors confirmed that no chatter was occurring. The torque data filtering and analysis techniques of the present disclosure have thus been demonstrated to provide the following advantages: clearly and accurately indicating the chatter condition when it exists, clearly and accurately indicating the absence of chatter when none exists, and eliminating the many false positive spikes which exist in the frequency response spectrum of the unfiltered torque data.

The preceding discussion describes frequency-domain filtering of spindle motor torque data, including two filtering steps—spectral subtraction of an air-cut reference signal, and filtering out of spindle harmonic frequencies. These filtering steps effectively prepare the spindle motor torque data for analysis to detect chatter. Other types of filtering models, and other types of motor data from the machine tool, may be added to the techniques discussed above. These additional data sources and filtering models, which have been demonstrated to be advantageous in certain chatter detection applications, are discussed below.

First, two additional filtering steps will be discussed, where these filtering steps address other sources of signal noise which are not addressed in the air-cut spectral subtraction and spindle harmonics attenuation discussed above. The two additional filtering steps discussed below include removal of aliasing artifacts and removal of encoder interpolation errors.

Aliasing is the overlapping of frequency components resulting from a data sample rate below the Nyquist frequency. The Nyquist frequency is a characteristic of a sampler, which converts a continuous function or signal into a discrete sequence. For a given sampling rate (samples per second), the Nyquist frequency (cycles per second) is the frequency whose cycle-length (or period) is twice the interval between samples, thus 0.5 cycle/sample. Insufficient sampling frequency results in distortion or artifacts when the signal is reconstructed from samples, which causes the reconstructed signal to differ from the original continuous signal.

As a simple example, consider a 10 Hz sine wave which is sampled with time-series data collected at 15 Hz and at 50 Hz. When converted to the frequency domain, the 15 Hz sample data indicates a strong frequency response at 5 Hz, which is incorrect, and is due to aliasing effects. The 50 Hz sample data indicates a strong frequency response at 10 Hz, which is correct; this is because the sampling frequency is sufficiently higher than the frequency content of the signal. In other words, a sampling rate of 50 Hz is sufficiently high to avoid aliasing effects in a 10 Hz data signal.

In the chatter detection application of the present disclosure, aliasing causes artificial peaks to be present in the frequency response spectrum resulting from the interaction between sampling frequency and cutting frequency. In a machine tool being monitored for chatter, the torque command exists in the CNC control system with control loops operating at different frequencies. Thus, the resulting frequency response spectrum could exhibit a mixture of real contents and artificial contents due to aliasing effects from the slower component of the CNC controller. Assuming the slower component of the controller operates at a sampling frequency ($f_s$) of 1000 Hz, the corresponding Nyquist frequency ($f_{Nyquist}$) is 500 Hz, where artificial peaks due to aliasing can arise above this frequency.

The cutting frequency in a machine tool is the frequency at which the flutes or teeth of the cutting bit/tool (e.g., end mill) make contact with the workpiece. For example, for a cutting tool with six flutes turning at 1600 RPM, the cutting frequency ($f_{cutting}$) is $(1600)*(1/60)*(6)$, or 160 Hz.

Nyquist zones are a series of frequency zones which are defined by the sampling frequency ($f_s$). Artificial peaks in the frequency response spectrum may appear within Nyquist zones. The first Nyquist zone envelops the cutting frequency ($f_{cutting}$) itself, which is 160 Hz. The second Nyquist zone contains an artificial peak at a frequency which is found by "folding" the cutting frequency ($f_{cutting}$) in the first Nyquist zone about one-half the sampling frequency ($f_s/2$); 160 Hz folded about/across 500 Hz is 840 Hz, which is located in the second Nyquist zone. The third Nyquist zone contains an artificial peak at a frequency which is found by folding the artificial peak in the second Nyquist zone about the sampling frequency ($f_s$); 840 Hz folded about/across 1000 Hz is 1160 Hz, which is in the third Nyquist zone. Continuing in this manner, the artificial peak in the fourth Nyquist zone occurs at a frequency which is found by folding the artificial peak in the third Nyquist zone about 1.5 times the sampling frequency ($3 f_s/2$); 1160 Hz folded about/across 1500 Hz is 1840 Hz, which is in the fourth Nyquist zone.

Knowing the frequencies of the artificial peaks in the Nyquist zones from the above calculations and discussion, it is possible to filter the frequency response spectrum to remove the noise (artificial peaks) which is due to aliasing artifacts. The frequencies at which aliasing noise will be found, for a sampling frequency of 1000 Hz and a cutting frequency of 160 Hz, are computed using the following calculation:

$$f_{noise} = |k \cdot 1000 + 160| \quad (10)$$

$$\{k = -N, \ldots, N\}$$

The calculation of Equation (10) results in noise frequencies ($f_{noise}$) of 840 Hz, 1160 Hz, 1840 Hz, 2160 Hz, etc.

A filter can then be applied to the frequency response data to remove the artificial peaks which are due to aliasing effects, as follows:

$$|T_{cmd}^{filt}(\omega)| = 0.01 \cdot |T_{cmd}^{orig}(\omega_{noise})| \quad (11)$$

$$\{\omega_{noise} = f_{noise}(k)\}$$

The filtering step defined in Equation (11) dictates that for each aliasing-related noise frequency $\omega_{noise}=f_{noise}$ (evaluated at the values of k), the filtered torque command is computed as the original torque command multiplied by a small value (e.g., 0.01) in order to dramatically reduce its magnitude.

Figure 7:
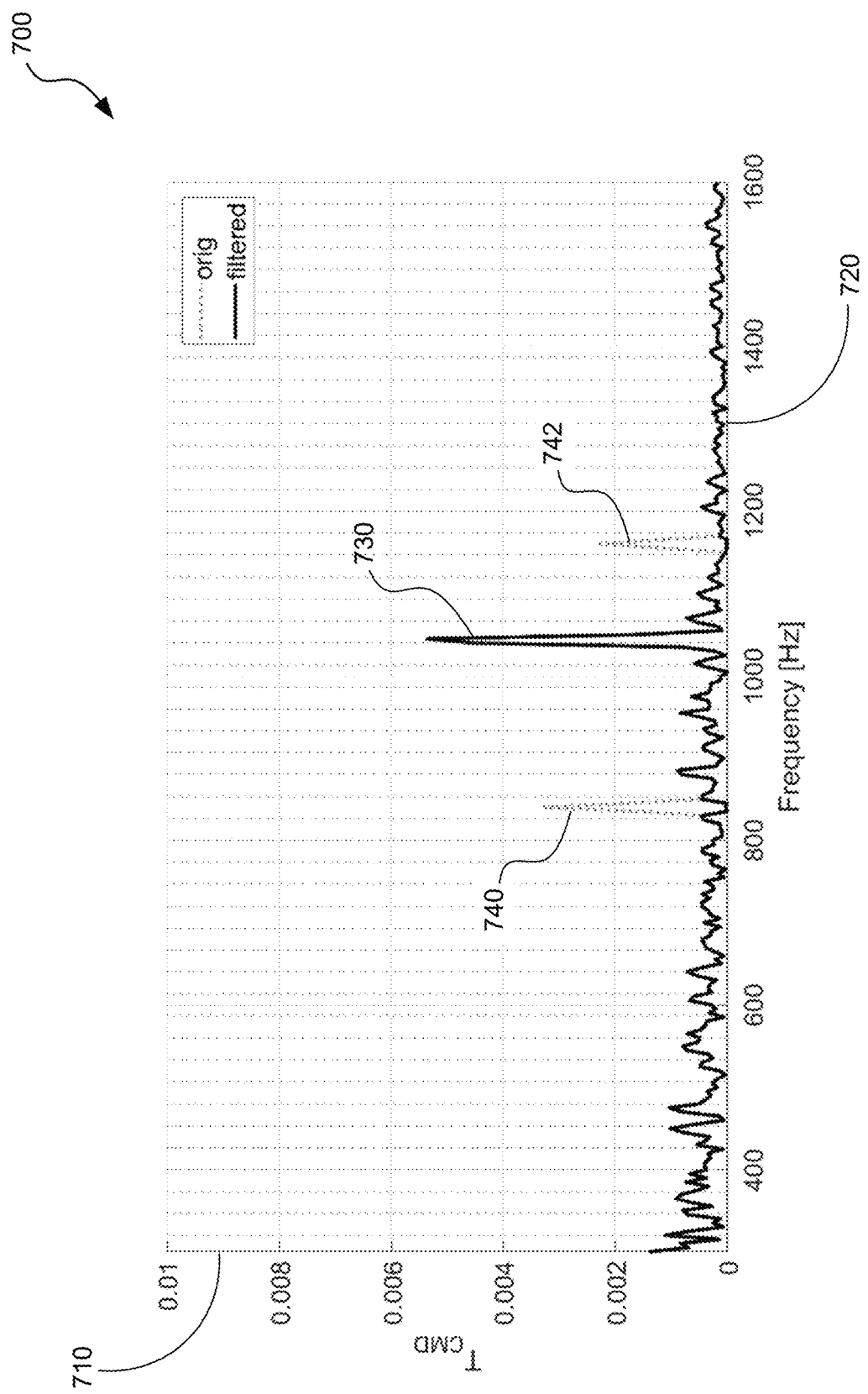
FIG. 7 is a frequency response graph of motor torque command data both before and after filtering to remove aliasing effects, according to an embodiment of the present disclosure.

FIG. 7 is a frequency response graph 700 of motor torque command data both before and after filtering to remove aliasing effects, according to an embodiment of the present disclosure. The graph 700 plots a torque command (as a percentage of a maximum value) on a vertical axis 710 against frequency on a horizontal axis 720. A large spike 730 in the frequency response indicates an actual chatter occurring at about 1050 Hz.

The graph 700 includes plots for both original (before aliasing filtering) torque data and filtered torque data (after aliasing filtering), as indicated by the legend. The original, unfiltered torque data includes significant spikes in the response, indicated at 740 and 742, in addition to the spike 730 at the chatter frequency. The response spikes 740 and 742 could easily be mistaken for chatter in an analysis of the original, unfiltered torque data.

The filtered torque data includes only the spike 730 at the actual chatter frequency. The spikes 740 and 742, which are aliasing effects occurred at frequencies of 840 Hz and 1160 Hz, respectively, in the original torque data, have been eliminated using the filtering technique described above. The data on the graph 700 of FIG. 7 is from an experiment with a sampling frequency ($f_s$) of 1000 Hz and a cutting frequency ($f_{cutting}$) of 160 Hz. Thus, the resulting noise frequencies in each Nyquist zone, calculated using Equation (10) and filtered out using Equation (11), include the frequencies of 840 Hz and 1160 Hz. The elimination of the artificial peaks in the frequency response data, illustrated in FIG. 7, demonstrates how the aliasing filtering technique further improves machine tool chatter detection.

Another filtering step involves removing encoder interpolation errors from the machine tool frequency response. A common type of rotary shaft encoder interpolates rotation of a motor shaft from sine and cosine signals. Encoder interpolation errors arise from interactions between encoder line count (number of sine and cosine waves around the circumference of the shaft) and motor rotational frequency. Particularly, encoder error noise is introduced at frequencies which are multiples of the motor frequency (in Hz) multiplied by the number of lines on the encoder. The encoder interpolation errors in the time-series data, which are motor-speed-dependent, can manifest themselves in artificial spikes in the frequency response data for the machine tool.

The number of lines on the encoder is known for a particular motor. Therefore, the frequencies at which encoder error noise are expected can be computed using the following calculation:

$$f_{noise} = k \cdot f_{motor} \cdot N_{lines} \quad (12)$$

$$\{k = 1, 2, \ldots\}$$

Where $f_{motor}$ is the motor frequency in Hz (motor rpm divided by 60), and $N_{lines}$ is the number of lines on the encoder. The calculation of Equation (12) results in a set of noise frequencies ($f_{noise}$) for any given motor speed.

A filter can then be applied to the frequency response data to remove the artificial peaks which are due to encoder interpolation errors, in the same manner as defined in Equation (11). That is, for each encoder error-related noise frequency $\omega_{noise}=f_{noise}$ (evaluated at the values of k), the filtered torque command is computed as the original torque command multiplied by a small value (e.g., 0.01) in order to dramatically reduce its magnitude. Artificial peaks due to aliasing of the encoder interpolation errors may also exist but can be calculated and filtered as described previously.

When experimental data for a non-chatter condition is collected and the frequency response is plotted in the same manner as shown in FIG. 7, many small-to-medium size spikes appear at regular frequency intervals in the original torque command data. The frequency intervals where the spikes occur correlate to the encoder error noise frequency intervals from Equation (12). When the encoder error filtering frequencies are computed as in Equation (12) and applied to the frequency response data, the artificial spikes are eliminated from the filtered frequency response. This demonstrates the effectiveness of the filtering step for removing encoder interpolation errors, which in turn enables more accurate machine tool chatter detection.

It is worth noting that the first filtering step described earlier—spectral subtraction of the air-cut reference signal—actually removes a large portion of the encoder errors for the spindle motor (the encoder errors are contained in the air-cut reference signal, because the air-cut spindle speed is the same as the cutting spindle speed). Thus, for spindle motor torque data, the encoder error filtering step essentially performs a clean-up of any small spikes in the frequency response spectrum which were not entirely removed by the spectral subtraction of the air-cut reference signal. In later discussion, it is explained how the encoder error filtering step is very important when using servo motor frequency response data (as opposed to spindle motor data) for chatter detection.

The discussion above has all been directed to filtering and analysis of spindle motor torque data; that is, the torque data for the motor which drives the spindle, which in turn holds the cutting bit (e.g., end mill). To summarize, four frequency-domain filtering steps have been described above: spectral subtraction of an air-cut reference signal, filtering for removal of peaks in the frequency response at spindle harmonic frequencies, filtering to remove aliasing effects, and filtering to remove encoder interpolation error effects. Referring back to the flowchart diagram of FIG. 3, all of these filtering steps are performed at the block 314. Then the filtered frequency-domain torque signal is analyzed at the block 316 to detect any chatter condition.

In addition to spindle motor data, data from the servo motors which are used for positioning the machine tool may also be analyzed to effectively detect chatter. As discussed earlier, many machine tools of the type illustrated in FIG. 2 are configured for independent positioning in three orthogonal directions—typically identified as X, Y and Z axes. A servo motor is used for positioning in each axial direction, where each of the three servo motors is controlled by the machine controller 240 in order to carry out a particular pre-programmed machining operation.

Data from the servo motors may be filtered and analyzed to detect chatter in a manner similar to that described above for spindle torque data. In fact, in some types of machines and applications, data from one or more of the servo motors may provide a more reliable indicator of chatter than the spindle motor data. For example, in a machine where the spindle is belt driven from the spindle motor, the belt-related compliance and damping which exist between the spindle motor and the cutting bit (e.g., end mill) may distort the time-domain spindle motor torque data, possibly causing the filtered frequency-domain spindle data to be less effective as a chatter indicator. In cases such as this, frequency response data from one or more of the servo motors may be the best indicator of chatter in the machine tool, and it is therefore advantageous to analyze data from all of the motors in the machine tool.

In the earlier discussion of spindle motor data collection and filtering, the data collected from the spindle motor was always described as a torque signal. This is because the time-series torque data for the spindle motor is readily available, such as by monitoring motor current. In the case of servo motors, there is another option. The frequency response analysis of servo motor data could be based on either motor torque data or pulse coder data. A pulse coder is a device integral to each servo motor which measures the angular position of the servo motor shaft. Time-domain pulse coder angular position data from each servo motor may be numerically differentiated to provide a velocity signal. Alternately, the pulse coder may provide angular velocity information directly. In either case, the time-domain velocity signal can be converted to the frequency domain, where filters can be applied and the frequency response characteristics analyzed to detect chatter in the manner described. Some considerations in using motor torque data or pulse coder position/velocity data for the servo motors are discussed further below.

The concepts described herein for servo motor data filtering and analysis are applicable to all three positioning servo motors (X, Y and Z directions). However, some the filtering and analysis of servo motor data is typically handled somewhat differently than the filtering and analysis of spindle motor data. In particular, when processing servo motor data, some of the four filtering steps described earlier are not applicable.

First, it is important to note that the positioning servo motors have time-varying motions. That is, during the course of a machining operation, each of the three positioning servo motors may turn at different speeds, and in both directions, or may be stopped altogether. This is unlike the spindle motor which generally turns in only one direction and at an essentially constant speed during both cutting and air-cut portions of a programmed machining operation.

The time-varying motions of the servo motors means that spectral subtraction of an air-cut reference signal is not possible, at least not in a practical manner. The reason is because the air-cut data needs to be collected for a specific motor speed. The only way that spectral subtraction of an air-cut reference signal can be performed accurately is if the entire machining operation is performed in air-cut mode so that the exact combinations of servo motor speeds and directions is captured in the air-cut reference signal. Keeping in mind that it is desirable to update the air-cut reference signal periodically to accurately reflect current machine conditions, spectral subtraction of an air-cut reference signal for the servo motors becomes impractical. As a result of this, spectral subtraction of an air-cut reference signal (the first of the four filtering steps) is not performed for servo motor data.

Regarding the second filtering step, for removal of spindle harmonics, this filtering step is applied to servo motor data (torque or velocity) in the same manner as applied to spindle motor data. This is to filter out the forced vibration contents which may be transmitted from the spindle rotation to the servo motors, and is done to better highlight the chatter component, especially for lighter chatter cases.

The third filtering step—for removal of aliasing effects—may be performed on servo motor data, depending on the type (source) of data used for the servo motors. If torque data is used for the servo motors, then the filtering step for aliasing removal is performed in the same manner as applied to spindle more torque data. However, if pulse coder position/velocity data is used for the servo motor signals, then the aliasing effects discussed earlier are not present in the frequency response data. This is because the aliasing effects arise due to the interaction of the controller's slower feedback frequency with the cutting frequency. When servo motor torque is not used for the servo motor signal, the aliasing effect is not introduced. Therefore, if pulse coder position/velocity data is directly used for the servo motor signals, the filtering step for removal of aliasing effects is not performed.

The fourth filtering step—for removal of encoder interpolation errors—is performed and is especially important for the servo motor data. This is because the spectral subtraction of an air-cut reference signal is not performed for servo motor data (as discussed above). Therefore, the encoder interpolation errors are present in servo motor data and their removal is important for accurate and reliable chatter detection in the frequency response data. Furthermore, because the servo motors operate at variable speeds, and the encoder interpolation error frequencies are a function of motor speed, the encoder error noise frequencies (calculated in Equation (12)) must be computed and applied to frequency-domain data for the particular operating speed of each servo motor at a particular condition of the machine tool and machining program. This calculation can be performed in real time as each new brief time segment of data is converted to the frequency domain and analyzed for chatter detection.

Figure 8:
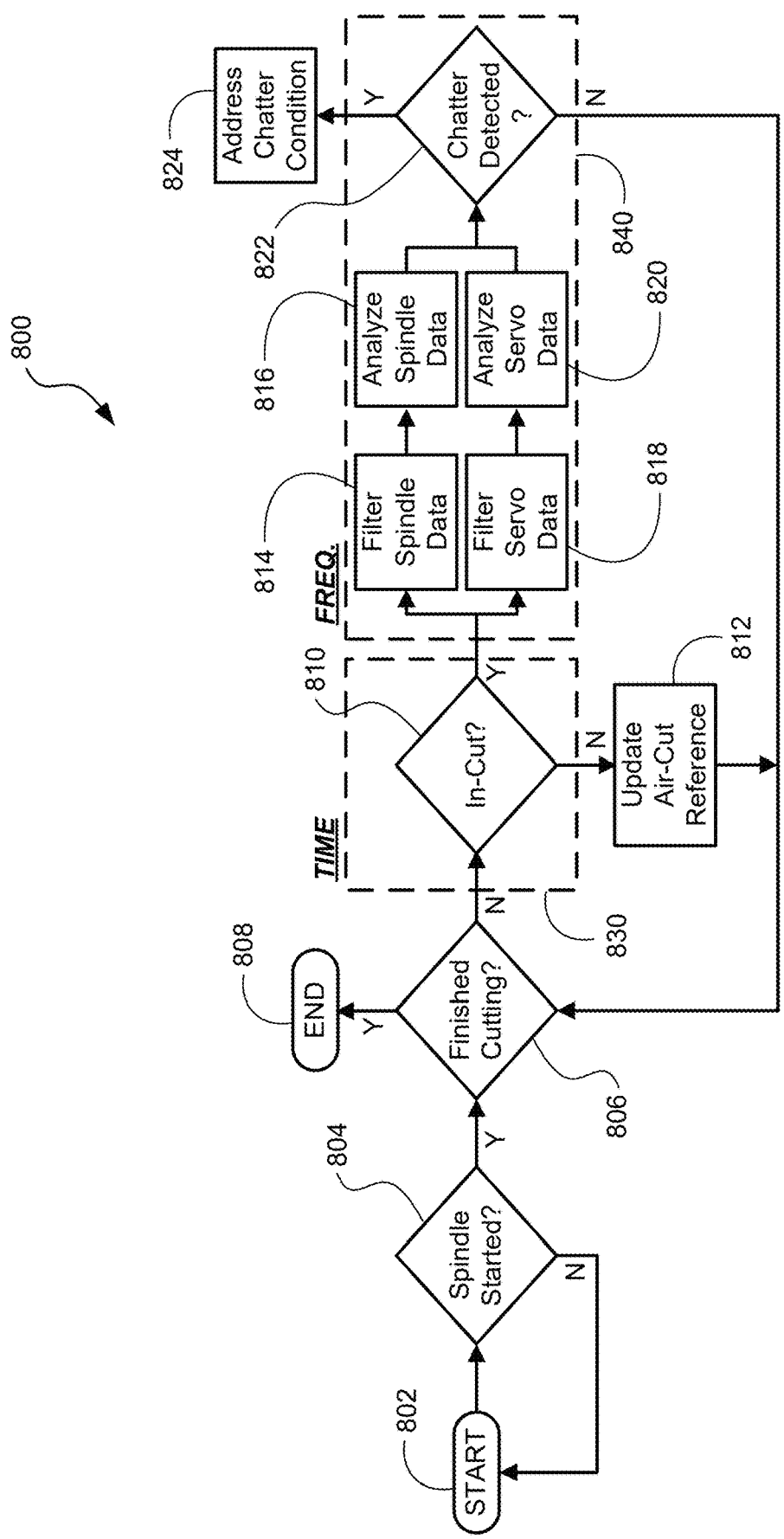
FIG. 8 is a flowchart diagram of a method for sensorless chatter detection in a machine tool, using a multi-step filtering process in the frequency domain, and including both spindle and servo motor data filtering and analysis, according to an embodiment of the present disclosure.

FIG. 8 is a flowchart diagram 800 of a method for sensorless chatter detection in a machine tool, using a multi-step filtering process in the frequency domain, and including both spindle and servo motor data filtering and analysis, according to an embodiment of the present disclosure. The method of FIG. 8 can be programmed to run in the machine tool controller 240, and uses input data which is readily available in any controller architecture—including spindle motor torque data derived from spindle motor current, and either motor torque or pulse coder position/velocity data for servo motors.

The left-hand side of the flowchart diagram 800 is essentially the same as the corresponding portions of the flowchart diagram 300 of FIG. 3, discussed earlier. From a start block 802, the process waits at a decision diamond 804 until detecting that the spindle of the machine tool has started. When the spindle is turning, at decision diamond 806 it is determined if the entire cutting or machining operation has finished, and if so, the process ends at terminus 808. When the machining operation program is still running, at decision diamond 810 it is determined whether the cutting bit (e.g., end mill) is currently cutting material. This determination is made by comparing the time-domain spindle motor torque signal to the previously-stored air-cut reference signal, as described earlier. When material is not being cut, at block 812 the air-cut reference torque signal is updated (such as by averaging the currently-collected air-cut spindle torque data with previously-collected data) and the process returns to the decision diamond 806.

As described earlier for corresponding portions of FIG. 3, the step contained in dashed box 830 is performed in the time domain, while the steps contained in dashed box 840 are performed in the frequency domain. The method of FIG. 3 is used for applications where only spindle motor data is to be evaluated. In the method of FIG. 8, both spindle motor and servo motor data is evaluated, and these steps are contained in the box 840.

At block 814, after converting the time-series spindle data to the frequency domain, the spindle data is filtered as described in detail above. This includes the four frequency-domain filtering steps designed to improve the ability to detect chatter in the frequency response data for the machine tool. At block 816, the spindle motor frequency response data (after filtering) is analyzed to determine if chatter is occurring.

At block 818, after converting the time-series servo motor data to the frequency domain, the servo data is filtered as described in detail above. This includes applying two or three of the frequency-domain filtering steps (depending on whether servo motor torque or pulse coder data is used as the input signal) designed to improve the ability to detect chatter in the frequency response data for the machine tool. At block 820, the servo motor frequency response data (after filtering) is analyzed to determine if chatter is occurring.

In a preferred embodiment, one chatter indicator is used for each type of motor. For spindle motor torque data, analyzed at the block 816, the preferred indicator is the magnitude ratio of the filtered spindle torque command data ($T_{cmd}^{filt}(\omega)$) to the air-cut torque command data ($T_{cmd}^{air}(\omega)$). As defined in Equations (7) and (8), when the magnitude ratio is much greater than zero at any frequency in the frequency response spectrum, this is taken as an indicator that chatter is occurring at that frequency. For servo motor data analyzed at the block 820 (from a torque signal or a pulse coder position/velocity signal), the preferred indicator is the magnitude of the filtered servo motor command data. When the magnitude of the filtered servo motor torque or velocity is much greater than zero at any frequency in the frequency response spectrum, this is taken as an indicator that chatter is occurring at that frequency.

The meaning of "much greater than zero" in the analyses at the blocks 816 and 820 may be defined in a manner found to be suitable for a particular application—such as "greater than 0.1", or "greater than 0.25", etc. Preferably, the computed values of the chatter indicators are checked against pre-defined thresholds for chatter detection, where the thresholds (one for each of the chatter indicators) are defined based on experience from known chatter and non-chatter operational data. A Z-score (median and deviation analysis) may also be used to determine if particular features in the frequency response data, for both the spindle motor and servo motor indicator parameters, are outliers indicative of chatter.

Returning to the flowchart of FIG. 8, after the filtered frequency response spectrum is analyzed at the blocks 816 (for spindle motor data) and 820 (for data from all three servo motors), at decision diamond 822 it is determined if chatter is detected in the analysis of data from any of the motors. When no chatter is detected, the process returns to the decision diamond 806 and the data collection and analysis continues in real time as long as the machining operation is still being performed. From the decision diamond 822, when chatter is detected in any motor signal analysis, at block 824 the machine controller takes steps to address and eliminate the chatter condition. As discussed earlier, a primary technique used to eliminate chatter is to change the spindle speed, thereby moving away from the condition which is causing the chatter (i.e., a resonance or dynamic response which creates the phase shift depicted in FIG. 1). A technique for identifying spindle speeds having the potential to eliminate chatter was discussed earlier and defined in the calculation of Equation (9).

To summarize, the preceding discussion describes techniques for chatter detection using frequency-domain filtering and analysis of spindle motor torque data (with four different filtering operations) and also servo motor data (either torque data with three filtering operations, or pulse coder data with two filtering operations). In order to effectively apply these methods to chatter detection in a particular machine tool, it would be advantageous for the machine controller to have a user interface system which provides convenient real-time visualization of the machine's frequency response characteristics and chatter status, and allows configuration of the chatter detection parameters for the machine.

Figure 9:
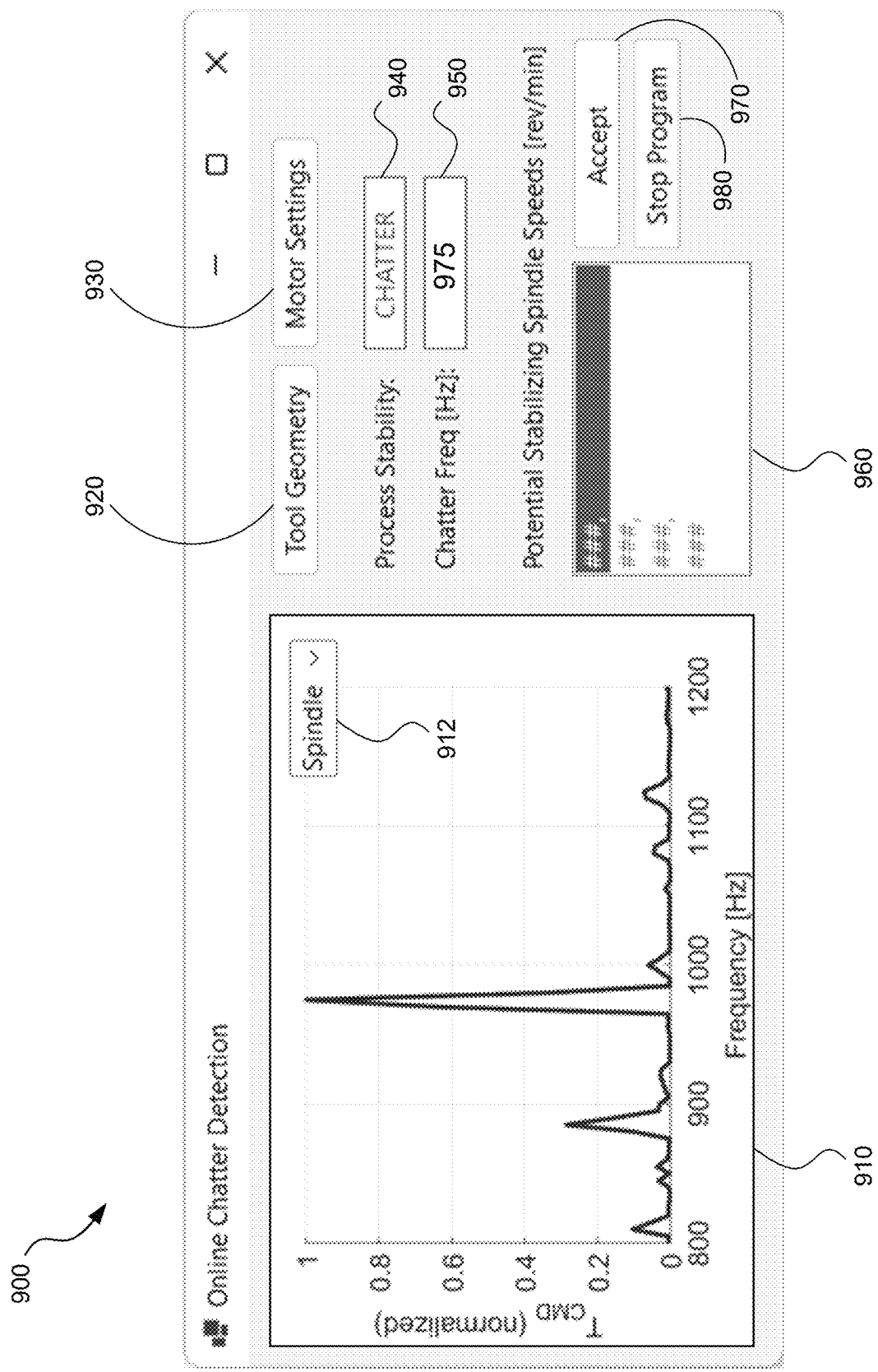
FIG. 9 is a mock-up of a graphical user interface providing chatter detection visualization and control features for a machine tool, according to an embodiment of the present disclosure.

FIG. 9 is a mock-up of a graphical user interface 900 providing chatter detection visualization and control features for a machine tool, according to an embodiment of the present disclosure. The graphical user interface 900 is displayed on a display device (such as a monitor or a tablet device) which is in communication with the machine controller. The display device is understood to have user input capability, such as a touch screen feature or a mouse, and optionally also a keyboard or keypad, for selecting buttons and menu options on the graphical user interface 900.

On the left side of the graphical user interface 900 is a frequency response graph window 910. The frequency response graph window 910 displays a frequency response graph for a particular motor of the machine tool. The particular motor is chosen from a drop-list 912, and in a preferred embodiment the drop-list 912 includes selectable options for; the spindle motor, the X servo motor, the Y servo motor and the Z servo motor. The frequency response graph window 910 displays the frequency response in real time, based on a rolling buffer of time-series data for the selected motor, where the time-series data for a brief time segment is converted to the frequency domain and displayed in the frequency response graph window 910. The frequency response graph depicts the response characteristic (e.g., normalized torque) for the selected motor, across the frequency spectrum, after all of the filtering operations described above.

A Tool Geometry button 920 allows a user to define the geometry parameters of the cutting bit or cutting tool (e.g., end mill). In a preferred embodiment, when the user clicks on the Tool Geometry button 920, a pop-up window allows the user to define a tool diameter (typically in millimeters)

and a number of flutes (e.g., 4 as shown in FIG. 2). The number of flutes on the tool is used in the calculation of spindle speeds which have the potential to avoid chatter, as defined in Equation (9) and discussed earlier. The number of flutes is also used to compute the cutting frequency which is used in the calculation and filtering of aliasing effects.

A Motor Settings button 930 allows a user to define parameters for chatter detection in the operation of the machine tool. In a preferred embodiment, when the user clicks on the Motor Settings button 930, a pop-up window appears containing a small table. In the first column of the table is a list of the motors which are included in the machine tool. In one common example, the motors include the spindle, the X servo, the Y servo and the Z servo. In a second column of the table is a priority number assigned to each of the motors. As discussed earlier, any particular machine tool is likely to exhibit different sensitivities to chatter in the different motors. For example, in one machine, the spindle motor may be the motor which most clearly depicts a chatter condition in its frequency response spectrum, while in another machine the Z servo most clearly depicts chatter. Because of this, the Motor Settings button 930 allows the user to define a priority for each motor; for example, the spindle could be defined as #1 priority (top priority for chatter detection), the Z servo as the #2 priority, the X servo as #3 priority and the Y servo as #4 priority. The table also includes a threshold value which is user-definable for each motor, where the threshold could be defined as a Z-score threshold (e.g., 3.5σ) above which it is determined that chatter is occurring. The Z-score was discussed earlier.

A Process Stability window 940 indicates at a glance whether the machine tool is current exhibiting a stable operating condition or if the machine tool is currently experiencing chatter (as shown in FIG. 9). If the Process Stability window 940 indicates chatter, then a Chatter Frequency window 950 displays the frequency (in Hz) at which chatter is occurring. The chatter frequency is determined by analysis of the filtered frequency response spectrum, as described in great detail throughout the present disclosure.

If the Process Stability window 940 indicates chatter, then a window 960 displays one or more spindle speeds (in rpm) which would potentially return the machine tool to a stable operating condition. The potential stabilizing spindle speeds displayed in the window 960 are calculated using Equation (9) discussed earlier. Using a mouse or touch-screen capability, the user may select one of the spindle speeds listed in the window 960, then click on an Accept button 970 to control the machine tool to change the spindle speed to the selected value. A Stop Program button 980 is provided to allow the user to stop the machine tool from running the machining operation program.

In some embodiments, an option may be included for the user to select the type of input signal for servo motors, where the options include servo motor torque data and pulse coder position/velocity data. These input data options, and the considerations around filtering and analyzing the frequency-domain response, were discussed earlier. The selection of the type of input data for servo motors could conveniently be included in the table which is accessed by the Motor Settings button 930, for example. Other input data—such as the number of lines on motor shaft encoders—could be defined by the user by clicking on the Motor Settings button 930, or elsewhere on the graphical user interface 900 as found suitable.

The graphical user interface 900 provides convenient chatter detection visualization and control features for a machine tool, while the data filtering and analysis techniques described above provide sensorless chatter detection with greater accuracy and sensitivity than previously-existing chatter detection methods.

The techniques described above—including the chatter detection methods using spindle motor and optionally servo motor data with a plurality of frequency-domain filtering steps, along with the graphical user interface for real-time monitoring and control to avoid chatter—provide powerful capabilities for detecting and eliminating chatter in machining operations. These capabilities can be further employed to minimize forced vibrations even in finishing machining operations where the depth of cut is small. By avoiding frequencies at which a particular machine tool is predisposed to exhibit excessive vibrations, the surface finish quality of the workpiece correspondingly improves.

A typical machining operation carried out by a machine tool includes a rough shaping operation followed by a finishing operation. In the rough shaping operation, where the surface finish quality is not important, a larger depth of cut can be used. The rough shaping operation machines the workpiece from its raw shape to a near-final shape. In the finishing operation, where surface finish quality is important, one or more passes are made with a smaller depth of cut.

The rough shaping operation, due to its high tool tooth forces, is much more likely to induce chatter than is the finishing operation. However, the information gained from the rough finishing operation—specifically the frequency response of the machine tool, particularly including a predominant chatter frequency—can be used to improve surface finish quality during finishing operations by avoiding the predominant chatter frequency which is near the machine tool's dominant natural frequency.

Figure 10:
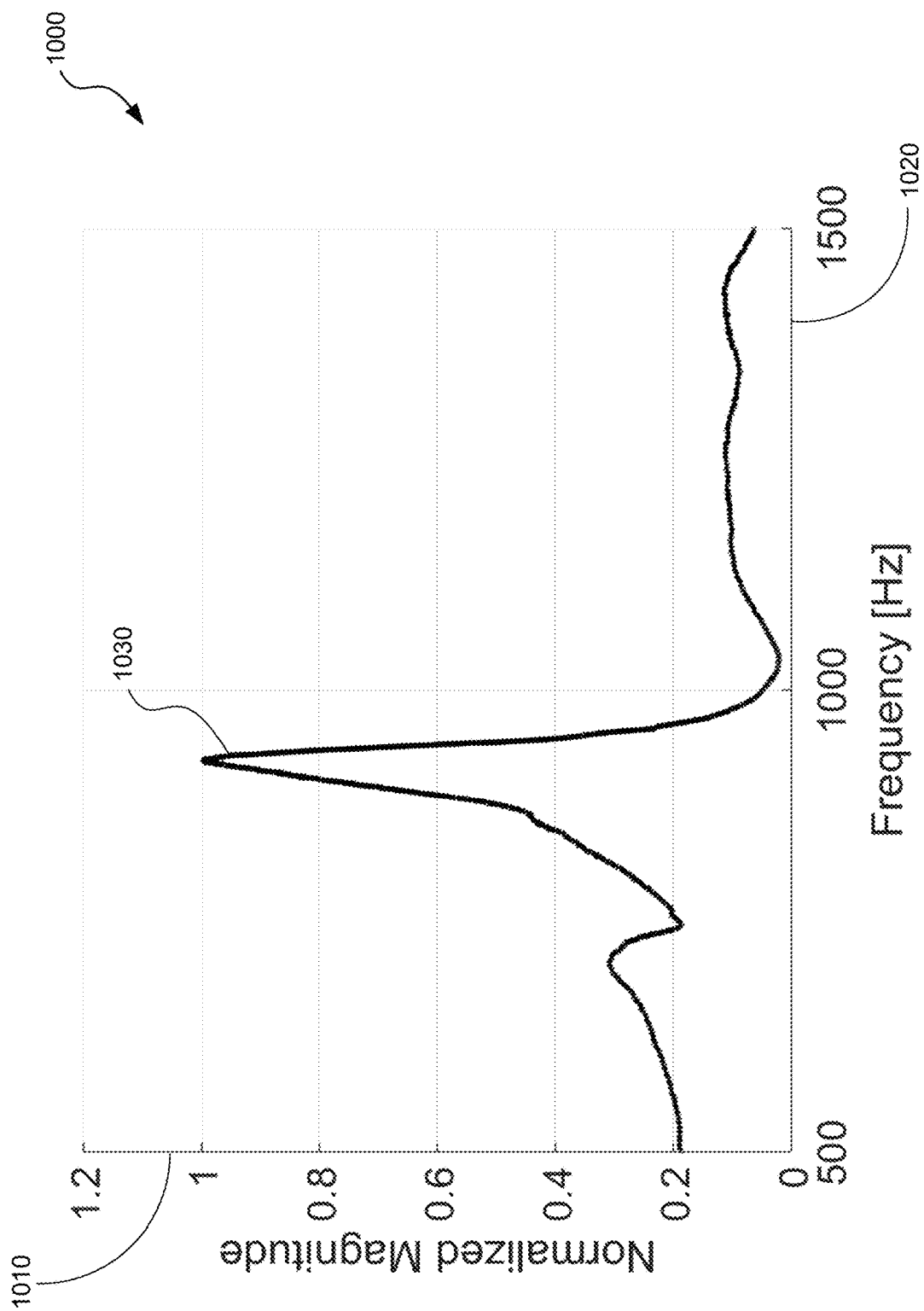
FIG. 10 is a graph of a measured frequency response function for a machine tool, according to an embodiment of the present disclosure.

FIG. 10 is a graph 1000 of a measured frequency response function for a machine tool, according to an embodiment of the present disclosure. The graph 1000 plots a normalized ratio of the output amplitude to the input amplitude on a vertical axis 1010 against frequency on a horizontal axis 1020. The graph 1000 includes a frequency response plot for one of the principle direction axes (i.e., Y axis) of the machine tool, measured at the cutting bit (e.g., end mill). A large spike 1030 in the frequency response function plot indicates a natural frequency of vibration at about 900 Hz.

The frequency response function plotted on the graph 1000 provides important information about the machine tool on which it was measured. Unfortunately, obtaining the natural frequency of vibration information as depicted on the graph 1000 requires an experimental setup which can be laborious, expensive and time-consuming; this includes fitting the machine tool with one or more motion sensors such as accelerometers, and running tests with a specialized impact device, a data acquisition system and computer. Fortunately, the natural frequency of the machine tool as depicted on the graph 1000 can also be estimated, without performing frequency response function testing, by using the sensorless chatter detection techniques disclosed above.

The methods of FIG. 3 (spindle data only) and FIG. 8 (both spindle and servo motor data) describe techniques for detecting chatter in a machine tool by filtering and analyzing frequency-domain torque or pulse coder data from the motors. FIGS. 6A, 7 and 9 all show a distinct spike in a frequency response graph which indicates chatter at a particular frequency. The chatter frequency detected in these filtered frequency response results can be used, in lieu of frequency response function testing, to determine a natural frequency of vibration to be avoided for the particular machine tool. When the disclosed sensorless chatter detection techniques were employed in a rough shaping machining operation on the same machine tool as embodied in the FIG. 10 results, the disclosed sensorless chatter detection techniques identified chatter at a frequency of around 900 Hz—the same result as the frequency response function testing.

As mentioned earlier, for finishing operations, the small depth of cut does not tend to excite significant chatter in the machine tool. However, finishing operations can still benefit from chatter detection technology, particularly because any excessive vibration in a finishing operation can ruin a workpiece. Therefore, it is desirable to know the predominant natural frequency of vibration for a particular machine tool, and ensure that the cutting frequency during finishing operations does not come near the machine's natural frequency.

The manufacturers of cutting bits (e.g., end mills) know that workpiece surface finish quality will suffer if the cutting bit is damaged. The manufacturers therefore tend to recommend a combination of spindle speed and feed speed which keeps the cutting tool in a healthy state. However, these recommendations do not take into account the actual natural frequencies of a particular machine tool. Thus, the recommended cutting speeds may not realize the optimal surface quality or productivity, and most operations would require further fine-tuning.

Table I contains setup parameters for five machining operation tests performed to determine the correlation between cutting frequency and vibration amplitude for finishing operations using the same machine tool as embodied in the FIG. 10 results.

TABLE I

| Test # | $\Omega$ [rev/min.] | F [mm/flute/rev] | Cutting Freq. + Harmonics [Hz] |
|---|---|---|---|
| 1 | 9231 | 0.082 | 615, 1231, 1846, . . . |
| 2 | 10000 | 0.082 | 667, 1333, 2000, . . . |
| 3 | 11000 | 0.082 | 733, 1467, 2200, . . . |
| 4 | 12000 | 0.082 | 800, 1600, 2400, . . . |
| 5 | 13500 | 0.082 | 900, 1800, 2700, . . . |

All of the tests shown in Table I were run at the same feed per flute (F=0.082 mm/flute/rev) and the same depth of cut and width of cut, where the depth of cut was 15.0 mm and the width of cut was 1.0 mm in all tests. The spindle speed $\Omega$ was varied from a manufacturer-recommended speed of 9231 rpm to a speed of 13500 rpm over the five tests. Regarding the feed speed F, it can be deduced that for a constant feed speed F expressed in mm/flute/rev, a higher spindle speed $\Omega$ results in a higher linear velocity of the tool in mm/sec. In other words, a higher spindle speed $\Omega$ allows a machining operation to be performed faster while maintaining a constant feed speed F.

The right-hand column of Table I shows the cutting frequency in Hertz, which is the number of flute impacts on the workpiece per second (discussed earlier in connection with the Nyquist zone computations), along with harmonics of the cutting frequency. For the machine tool on which the Table I tests were run, the disclosed sensorless chatter detection techniques identified chatter at a frequency of around 900 Hz—the same result as the frequency response function testing shown in FIG. 10. Because the machine tool is a structure with little inherent damping, the natural frequency spike in the frequency response function is fairly sharp, and the frequency band to be avoided can be defined to be fairly narrow. One example dictates that for the 900 Hz natural frequency of the machine tool, cutting frequencies in a range from 800 Hz to 1000 Hz should be avoided.

Returning to Table I, the spindle speed (9231 rpm) and feed speed recommended by the cutting tool manufacturer, used for Test #1, result in a cutting frequency of 615 Hz, which is well below the range to be avoided (800-1000 Hz). The remaining tests increased the spindle speed in increments up to 13500 rpm, which equates to a cutting frequency of 900 Hz.

Figure 11:
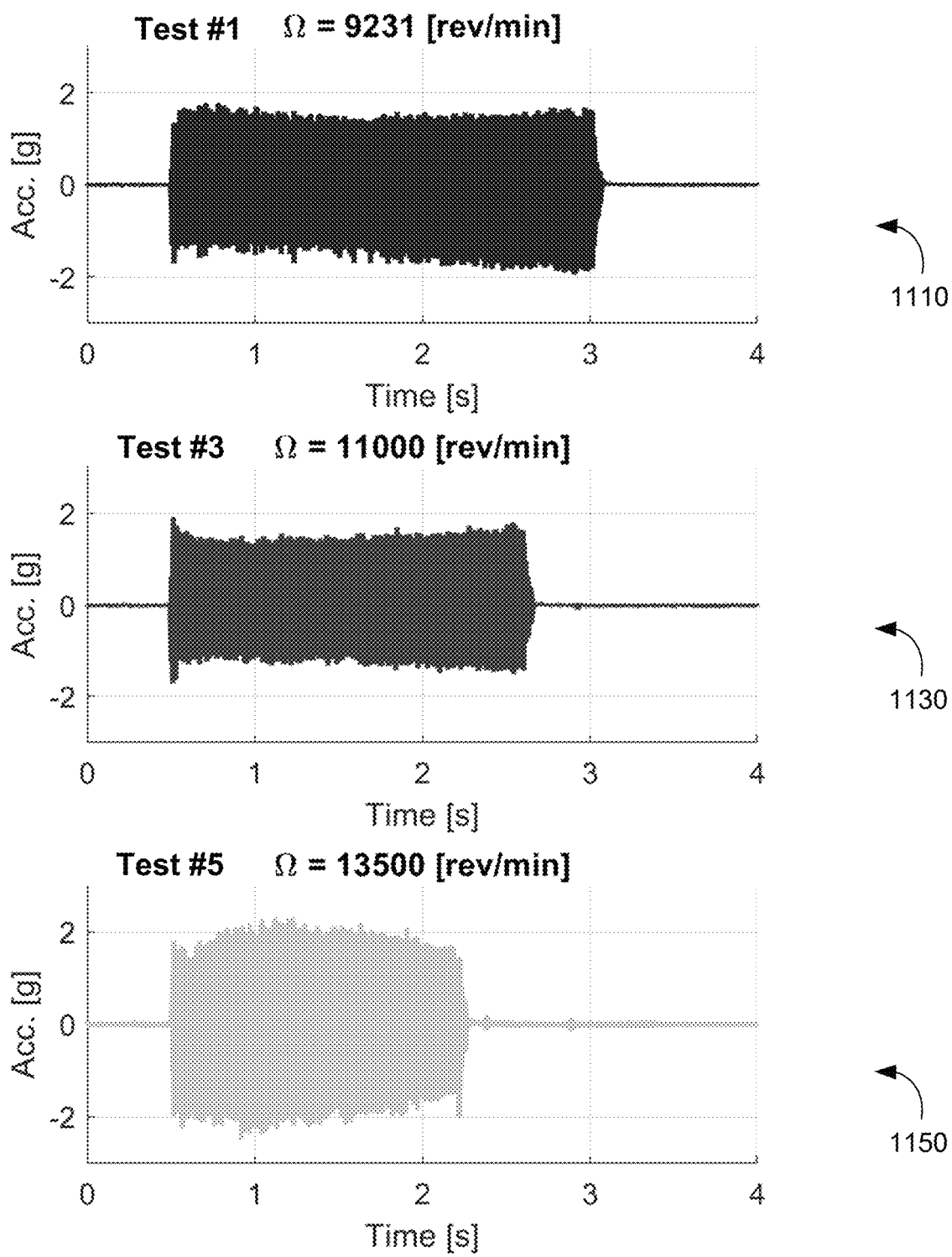
FIG. 11 is a set of graphs plotting acceleration versus time for three of the tests contained in Table I, according to embodiments of the present disclosure.

FIG. 11 is a set of graphs plotting acceleration versus time for three of the tests contained in Table I, according to embodiments of the present disclosure. A graph 1110 plots acceleration vs time for Test #1 of Table I, a graph 1130 plots acceleration vs time for Test #3 of Table I, and a graph 1150 plots acceleration vs time for Test #5 of Table I. All three of the graphs 1110, 1130 and 1150 plot the acceleration on a common vertical axis scale versus time on a common horizontal axis scale.

The graph 1110 depicts results from Test #1 with $\Omega$=9231 rpm and a cutting frequency of 615 Hz, which is well below the natural frequency of vibration (900 Hz) of the machine tool. The graph 1130 depicts results from Test #3 with $\Omega$=11000 rpm and a cutting frequency of 733 Hz, which is still below the natural frequency of vibration (900 Hz) and below the frequency band to be avoided (800-1000 Hz) of the machine tool. However, the graph 1150 depicts results from Test #5 with $\Omega$=13500 rpm and a cutting frequency of 900 Hz, which is equal to the natural frequency of vibration (900 Hz) of the machine tool. It can be seen that the vibration amplitude for the graph 1150 (Test #5) is significantly greater than for the other two graphs 1110 and 1130. The vibration amplitude (shown on the graphs of FIG. 11) correlates to surface finish quality, where greater vibration amplitude leads to lower surface finish quality. Thus, even though Test #5 does not exhibit chatter vibrations, it will produce poorer workpiece surface finish quality as a result of having the cutting frequency nearing the natural frequency of the machine tool.

It can also be seen on FIG. 11 that the elapsed time of each machining operation is different—where Test #1 runs for about 3.0 seconds, Test #3 runs for about 2.6 seconds, and Test #5 runs for about 2.2 seconds. This is because a higher spindle speed equates to a higher rate of linear travel of the cutting bit, as discussed above. Because machine throughput is always a concern for part manufacturers, it is desirable to run machining operations at a spindle speed and feed speed which are as high as possible (to maximize throughput) while keeping the cutting frequency out of the machine's natural frequency avoidance band. Therefore, it is preferable to run machining operations in the conditions of Test #3, which has a vibration amplitude no higher than Test #1, but a significantly shorter machining operation time duration.

The preceding discussion highlights the importance of avoiding a machine tool's natural frequency of vibration, even for light machining operations such as finishing where chatter is unlikely. Thus, after identifying a chatter frequency using the sensorless chatter detection techniques of the present disclosure, subsequent machining operations can be performed using machine speeds which avoid a frequency band defined as the chatter frequency plus or minus a certain amount (such as +/−100 Hz). This enables finishing operations to be carried out with the greatest spindle speed and feed speed (thus maximizing throughput) while staying away from the machine's natural frequency (thus maximizing surface finish quality).

The graphical user interface 900 of FIG. 9 could readily be enhanced to include features which guide the user to avoid cutting frequencies in the natural frequency band of the machine tool. For example, a machine settings button could be added which enable the user to define a spindle speed and a feed speed. Then, after a machining operation is performed where chatter is detected (as in FIG. 9 at the chatter frequency of 975 Hz), the graphical user interface 900 could recommend a spindle speed which is as high as possible while maintaining the cutting frequency outside the band (e.g., +/−100 Hz) surrounding the now-known chatter frequency of the machine tool. Other implementations may be envisioned by those skilled in the art—including a behind-the-scenes features which pops up a warning if a spindle speed and feed speed are input which cause the cutting frequency to fall in the machine's natural frequency band.

Throughout the preceding discussion, various computers and controllers are described and implied. It is to be understood that the software applications and modules of these computers and controllers are executed on one or more electronic computing devices having a processor and a memory module. In particular, this includes the machine controller 240 of FIG. 2 which was discussed earlier. Specifically, the processor in the controller 240 is configured to perform the sensorless machine tool chatter detection described above, including the method steps of FIGS. 3 and 8, and the calculations using the equations and other techniques described above, along with the control of the machine tool itself and the user interaction via the graphical user interface 900.

While a number of exemplary aspects and embodiments of the method for sensorless machine tool chatter detection have been discussed above, those of skill in the art will recognize modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for machine tool chatter detection, said method comprising:
   determining, by a controller of a machine tool, if the machine tool is cutting material from a workpiece based on spindle torque command data;
   when the machine tool is cutting material from the workpiece, converting an air-cut reference data set and the spindle torque command data to a frequency domain to create air-cut frequency data and torque command frequency data, respectively;
   filtering the torque command frequency data to produce filtered torque command data, said filtering including spectrally subtracting a multiple of the air-cut frequency data from the torque command frequency data, applying a filter to remove spindle harmonics, applying a filter to remove aliasing effects, and applying a filter to remove encoder interpolation error effects;
   evaluating a plurality of chatter indicators at frequencies across a frequency spectrum, where a first indicator is a magnitude of the filtered torque command data, and a second indicator is a magnitude ratio of the filtered torque command data to the air-cut frequency data; and
   changing operating conditions of the machine tool, by the controller, when a comparison of the first and second indicators to predefined criteria indicates that chatter is occurring based on either indicator.

2. The method according to claim 1 wherein the spindle torque command data is determined from machine tool spindle motor current data.

3. The method according to claim 1 wherein determining if the machine tool is cutting material from the workpiece includes comparing the spindle torque command data to the air-cut reference data set.

4. The method according to claim 1 wherein, when the machine tool is not cutting material from the workpiece, the air-cut reference data set is updated by averaging a current time segment of the spindle torque command data with data already contained in the air-cut reference data set.

5. The method according to claim 1 wherein converting the air-cut reference data set and the spindle torque command data to a frequency domain includes using a Fast Fourier Transform computation.

6. The method according to claim 1 wherein spectrally subtracting a multiple of the air-cut frequency data from the torque command frequency data includes subtracting the multiple of the air-cut frequency data from the torque command frequency data at frequencies across a frequency spectrum, where the multiple has a value between one and two, and further includes applying a mapping function to eliminate negative values after spectrally subtracting the multiple of the air-cut frequency data.

7. The method according to claim 1 wherein applying a filter to remove spindle harmonics includes multiplying the torque command frequency data by a constant at frequencies equal to integer multiples of the spindle speed, and the constant has a value less than 0.1.

8. The method according to claim 1 wherein applying a filter to remove aliasing effects includes multiplying the torque command frequency data by a constant at a plurality of artificial peaks in Nyquist zones, where the frequencies of the artificial peaks are computed as an absolute value of a sum of a cutting frequency and positive and negative integer multiples of a data sampling frequency, and the constant has a value less than 0.1.

9. The method according to claim 1 wherein applying a filter to remove encoder interpolation errors includes multiplying the torque command frequency data by a constant at a plurality of encoder error frequencies, where the encoder error frequencies are computed as integer multiples of a motor frequency in Hertz multiplied by a number of lines on a motor shaft encoder, and the constant has a value less than 0.1.

10. The method according to claim 1 wherein evaluating a first indicator includes comparing, at each frequency, the magnitude of the filtered torque command data to a threshold, the threshold is determined in a computation relative to the air-cut frequency data or is determined from statistical analysis of previously-collected data, and the filtered torque command data exceeding the threshold at a particular frequency indicates chatter at the particular frequency.

11. The method according to claim 1 wherein evaluating a second indicator includes comparing, at each frequency, the magnitude ratio to a threshold, the threshold is defined to have a specific value greater than zero or is determined from statistical analysis of previously-collected data, and the magnitude ratio exceeding the threshold at a particular frequency indicates chatter at the particular frequency.

12. The method according to claim 1 further comprising determining a chatter frequency when the comparison of the first and second indicators to predefined criteria indicates that chatter is occurring based on either indicator, and where changing operating conditions of the machine tool includes changing a spindle speed to a new speed determined in a calculation based on the chatter frequency and a number of flutes on a cutting bit in the machine tool.

13. A method for machine tool chatter detection, said method comprising converting an air-cut reference data set and spindle torque command data to a frequency domain to create air-cut frequency data and torque command frequency data, respectively, filtering the torque command frequency data to produce filtered torque command data, said filtering including spectrally subtracting a multiple of the air-cut frequency data from the torque command frequency data, applying a filter to remove spindle harmonics, applying a filter to remove aliasing effects, and applying a filter to remove encoder interpolation error effects, evaluating a first chatter indicator which is a magnitude of the filtered torque command data and a second chatter indicator which is a magnitude ratio of the filtered torque command data to the air-cut frequency data, and changing operating conditions of the machine tool when the first or second chatter indicator indicates that chatter is occurring.

14. A sensorless machine tool chatter detection system, said system comprising:
a machine tool configured for performing an operation on a workpiece; and
a controller in communication with the machine tool, said controller being configured to detect chatter by performing steps including;
determining if the machine tool is cutting material from the workpiece based on spindle torque command data;
when the machine tool is not cutting material from the workpiece, storing a time segment of the spindle torque command data in an air-cut reference data set;
when the machine tool is cutting material from the workpiece, converting the air-cut reference data set and the spindle torque command data to a frequency domain to create air-cut frequency data and torque command frequency data, respectively;
filtering the torque command frequency data to produce filtered torque command data, said filtering including spectrally subtracting a multiple of the air-cut frequency data from the torque command frequency data, applying a filter to remove spindle harmonics, applying a filter to remove aliasing effects, and applying a filter to remove encoder interpolation error effects;
evaluating a plurality of chatter indicators at frequencies across a frequency spectrum, where a first indicator is a magnitude of the filtered torque command data, and a second indicator is a magnitude ratio of the filtered torque command data to the air-cut frequency data; and
changing operating conditions of the machine tool when a comparison of the first and second indicators to predefined criteria indicates that chatter is occurring based on either indicator.

15. The system according to claim 14 wherein spectrally subtracting a multiple of the air-cut frequency data from the torque command frequency data includes subtracting the multiple of the air-cut frequency data from the torque command frequency data at frequencies across a frequency spectrum, and a mapping function is then applied to eliminate negative values from the filtered torque command data after spectrally subtracting the multiple of the air-cut frequency data.

16. The system according to claim 14 wherein applying a filter to remove spindle harmonics includes multiplying the torque command frequency data by a constant at frequencies equal to integer multiples of the spindle speed, and the constant has a value less than 0.1.

17. The system according to claim 14 wherein applying a filter to remove aliasing effects includes multiplying the torque command frequency data by a constant at a plurality of artificial peaks in Nyquist zones, where the frequencies of the artificial peaks are computed as an absolute value of a sum of a cutting frequency and positive and negative integer multiples of a data sampling frequency, and the constant has a value less than 0.1.

18. The system according to claim 14 wherein applying a filter to remove encoder interpolation errors includes multiplying the torque command frequency data by a constant at a plurality of encoder error frequencies, where the encoder error frequencies are computed as integer multiples of a motor frequency in Hertz multiplied by a number of lines on a motor shaft encoder, and the constant has a value less than 0.1.

19. The system according to claim 14 wherein evaluating a first indicator includes comparing, at each frequency, the magnitude of the filtered torque command data to a first threshold, the first threshold is determined in a computation relative to the air-cut frequency data or is determined from statistical analysis of previously-collected data, and the filtered torque command data exceeding the first threshold at a particular frequency indicates chatter at the particular frequency, and where evaluating a second indicator includes comparing, at each frequency, the magnitude ratio to a second threshold, the second threshold is defined to have a specific value greater than zero or is determined from statistical analysis of previously-collected data, and the magnitude ratio exceeding the second threshold at a particular frequency indicates chatter at the particular frequency.

20. The system according to claim 14 wherein the controller is further configured for determining a chatter frequency when the comparison of the first and second indicators to predefined criteria indicates that chatter is occurring, and where changing operating conditions of the machine tool includes changing the spindle speed to a new speed determined in a calculation based on the chatter frequency and a number of flutes on a cutting bit in the machine tool.

* * * * *